United States Patent
Kim et al.

(10) Patent No.: US 10,862,565 B2
(45) Date of Patent: Dec. 8, 2020

(54) METHOD FOR SUPPORTING BEAMFORMING IN WIRELESS LAN SYSTEM AND APPARATUS THEREFOR

(71) Applicant: LG ELECTRONICS INC., Seoul (KR)

(72) Inventors: Jinmin Kim, Seoul (KR); Jinsoo Choi, Seoul (KR); Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/609,446

(22) PCT Filed: Apr. 11, 2018

(86) PCT No.: PCT/KR2018/004233
§ 371 (c)(1),
(2) Date: Oct. 29, 2019

(87) PCT Pub. No.: WO2019/045213
PCT Pub. Date: Mar. 7, 2019

(65) Prior Publication Data
US 2020/0044724 A1 Feb. 6, 2020

Related U.S. Application Data

(60) Provisional application No. 62/553,138, filed on Sep. 1, 2017, provisional application No. 62/554,587, filed on Sep. 6, 2017, provisional application No. 62/564,267, filed on Sep. 28, 2017.

(51) Int. Cl.
*H04B 7/06* (2006.01)
*H04B 17/336* (2015.01)
(Continued)

(52) U.S. Cl.
CPC .......... *H04B 7/0695* (2013.01); *H04B 7/0417* (2013.01); *H04B 7/0636* (2013.01); *H04B 17/336* (2015.01); *H04W 84/12* (2013.01)

(58) Field of Classification Search
CPC ...... H04B 17/336; H04B 7/06; H04B 7/0636; H04B 7/0695; H04B 7/0417; H04L 1/00; H04L 5/00; H04W 72/04
(Continued)

(56) References Cited

U.S. PATENT DOCUMENTS

2007/0147533 A1* 6/2007 Thomas ............... H04B 17/364
375/267
2014/0376535 A1* 12/2014 Murakami ............ H04B 7/024
370/338

(Continued)

FOREIGN PATENT DOCUMENTS

KR 1020130087561 8/2013
KR 101409916 6/2014

(Continued)

OTHER PUBLICATIONS

Assaf Kasher, Beamforming Training proposals, IEEE 802.11-16/0103r0, Jan. 18, 2016. See p. 10. (Year: 2016).*

(Continued)

*Primary Examiner* — Phong La
(74) *Attorney, Agent, or Firm* — Lee, Hong, Degerman, Kang & Waimey PC

(57) ABSTRACT

The present specification presents a method for supporting beamforming for inter-station signal transmission in a wireless local area network (WLAN) system and an apparatus therefor. Specifically, the present specification presents a method for supporting beamforming training for two channels subjected to channel aggregation and an apparatus therefor.

13 Claims, 30 Drawing Sheets

(51) Int. Cl.
*H04B 7/0417* (2017.01)
*H04W 84/12* (2009.01)

(58) Field of Classification Search
USPC .......................................................... 370/329
See application file for complete search history.

(56) References Cited

U.S. PATENT DOCUMENTS

| | | | |
|---|---|---|---|
| 2015/0289147 A1 | 10/2015 | Lou et al. | |
| 2019/0090253 A1* | 3/2019 | Da Silva | H04W 72/085 |
| 2019/0158321 A1* | 5/2019 | Liu | H04W 8/08 |
| 2019/0208463 A1* | 7/2019 | Lou | H04L 5/0032 |
| 2019/0260446 A1* | 8/2019 | Oteri | H04B 7/0695 |
| 2019/0268055 A1* | 8/2019 | Li | H04B 7/0617 |
| 2019/0288760 A1* | 9/2019 | Li | H04L 27/2646 |
| 2019/0288763 A1* | 9/2019 | Oteri | H04B 7/0697 |

FOREIGN PATENT DOCUMENTS

| | | | | |
|---|---|---|---|---|
| KR | 20150051911 A | * | 5/2015 | ........... H04B 7/0452 |
| KR | 20150058471 A | * | 5/2015 | ........... H04B 7/0421 |
| KR | 1020150052482 | | 5/2015 | |

OTHER PUBLICATIONS

PCT International Application No. PCT/KR2018/004233, International Search Report dated Jul. 27, 2018, 4 pages.

Da Silva, C. et al., "Contributions to the BRP TXSS procedure", IEEE P802.11 Wireless LANs, doc.: IEEE 802.11-17/1181r0, Jul. 2017, 12 pages.

European Patent Office Application Serial No. 18850573.9, Search Report dated Mar. 6, 2020, 15 pages.

Cordeiro, C., "Specification Framework for TGay", IEEE P802.11 Wireless LANs, doc.: IEEE 802.11-15/01358r9, Nov. 2015, 90 pages.

EEEE: "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhaned throughput for operation in license-exempt bands above 45 GHz," IEEE P802.11ay/D0.5, Aug. 2017, 348 pages.

Kasher, A., "BF comment resolution," IEEE P802.11 Wireless LANs, doc.: IEEE 802.11-17/0922r2, May 2017, 9 pages.

* cited by examiner

FIG. 9

| CH1z | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap filling, ay: 802.11ay)

FIG. 16

| | B0 B7 | B8 B15 | B16 | B17 | B18 | B19 | B20 | B21 B26 | B27 B28 | B29 B33 |
|---|---|---|---|---|---|---|---|---|---|---|
| | Element ID | Length | Initiator | TX-train-response | RX-train-response | TX-TRN-OK | TXSS-FBCK-REQ | BS-FBCK | BS-FBCK Antenna ID | FBCK-REQ |
| Bits: | 8 | 8 | 1 | 1 | 1 | 1 | 1 | 6 | 2 | 5 |

| | B34 B51 | B52 | B53 | B54 B55 | B56 B60 | B61 |
|---|---|---|---|---|---|---|
| | FBCK-TYPE | MID Extension | Capability Request | Reserved | BS-FBCK MSB | BS-FBCK Antenna ID MSB |
| Bits: | 18 | 1 | 1 | 2 | 5 | 1 |

| | B62 B65 | B66 | B67 | B68 |
|---|---|---|---|---|
| | Number of Measurements MSB | EDMG Extension Flag | EDMG Channel Measurement Present | Short SSW Packet Used |
| Bits: | 4 | 1 | 1 | 1 |

| | B69 | B70 | B71 | B72 B73 |
|---|---|---|---|---|
| | BRP-TXSS-OK | Aggregation Requested | Aggregation Present | Reserved |
| Bits: | 1 | 1 | 1 | 2 |

FIG. 17

| Field | Size | | Meaning |
|---|---|---|---|
| Element ID | 8 bits | | |
| Length | 8 bits | | |
| SNR | $SNR_1$ | 8 bits | If Aggregation Present field is set to 1, this field is for channel in channel aggregate which includes the primary channel. If Aggregation Present field is set to 0, this field is for channel which the measurement is taken. SNR as measured in the first TRN-T field or at the first sector from which SSW frame or Short SSW packet is received, or at the channel indicated by the first SISO ID subset |
| | $SNR_2$ | 8 bits | If Aggregation Present field is set to 1, this field is for channel in channel aggregate which includes the primary channel. If Aggregation Present field is set to 0, this field is for channel which the measurement is taken. SNR as measured in the second TRN-T field or at the second sector from which SSW frame or Short SSW packet is received, or at the channel indicated by the second SISO ID subset |
| | ⋮ | | |
| | $SNR_{N_{meas}}$ | 8 bits | If Aggregation Present field is set to 1, this field is for channel in channel aggregate which includes the primary channel. If Aggregation Present field is set to 0, this field is for channel which the measurement is taken. SNR as measured in the second TRN-T field or at the second sector from which SSW frame or Short SSW packet is received, or at the channel indicated by the second SISO ID subset |
| Channel Measurement | Channel Measurement 1 | $N_{taps} \times 16$ bits | If Aggregation Present field is set to 1, this field is for channel in channel aggregate which includes the primary channel. If Aggregation Present field is set to 0, this field is for channel which the measurement is taken. Channel measurement for the first TRN-T field or for the channel indicated by the first SISO ID subset |
| | Channel Measurement 2 | $N_{taps} \times 16$ bits | If Aggregation Present field is set to 1, this field is for channel in channel aggregate which includes the primary channel. If Aggregation Present field is set to 0, this field is for channel which the measurement is taken. Channel measurement for the first TRN-T field or for the channel indicated by the second SISO ID subset |
| | ⋮ | | |
| | Channel Measurement $N_{meas}$ | $N_{taps} \times 16$ bits | If Aggregation Present field is set to 1, this field is for channel in channel aggregate which includes the primary channel. If Aggregation Present field is set to 0, this field is for channel which the measurement is taken. Channel measurement for the $N_{meas}$ TRN-T field or for the channel indicated by the $N_{meas}$ SISO ID subset |
| Tap Delay | Relative Delay Tap #1 | 8 bits | The delay of Tap #1 in units of Tc relative to the path with the shortest delay detected. |
| | Relative Delay Tap #1 | 8 bits | The delay of Tap #2 in units of Tc relative to the path with the shortest delay detected. |
| | ⋮ | | |
| | Relative Delay Tap #$N_{taps}$ | 8 bits | The delay of Tap #$N_{taps}$ in units of Tc relative to the path with the shortest delay detected. |

FIG. 18

| | | | |
|---|---|---|---|
| Sector ID Order | Sector ID$_1$ | 6 bits | Sector ID for SNR$_1$ being obtained, or sector ID of the first detected beam. |
| | Antenna ID$_1$ | 2 bits | Antenna ID corresponding to sector ID$_1$. |
| | Sector ID$_1$ | 6 bits | Sector ID for SNR$_2$ being obtained, or sector ID of the second detected beam. |
| | Antenna ID$_1$ | 2 bits | Antenna ID corresponding to sector ID$_2$. |
| | Sector ID$_{Nmeas}$ or sector ID$_{Nbeam}$ | 6 bits | Sector ID for SNR$_{Nmeas}$ being obtained, or sector ID of the detected beam N$_{beam}$. |
| | Antenna ID$_{Nmeas}$ or Antenna ID$_{Nbeam}$ | 2 bits | Antenna ID corresponding to sector ID$_{Nmeas}$ or sector IDN$_{Nbeam}$. |
| (Additional) SNR | SNR$_1$ | 8 bits | If Aggregation Present field is set to 1, this field is for channel in channel aggregate which does not include the primary channel. If Aggregation Present field is set to 0, this field is not present. SNR as measured in the first TRN-T field or at the channel indicated by the first SISO ID subset |
| | SNR$_2$ | 8 bits | If Aggregation Present field is set to 1, this field is for channel in channel aggregate which does not include the primary channel. If Aggregation Present field is set to 0, this field is not present. SNR as measured in the first TRN-T field or at the channel indicated by the first SISO ID subset |
| | SNR$_{Nmeas}$ | 8 bits | If Aggregation Present field is set to 1, this field is for channel in channel aggregate which does not include the primary channel. If Aggregation Present field is set to 0, this field is not present. SNR as measured in the N$_{meas}$ TRN-T field or at the channel indicated by the N$_{meas}$ SISO ID subset |
| (Additional) Channel Measurement | Channel Measurement 1 | N$_{taps}$×16 bits | If Aggregation Present field is set to 1, this field is for channel in channel aggregate which does not include the primary channel. If Aggregation Present field is set to 0, this field is not present. Channel measurement for the first TRN-T field or for the channel indicated by the first SISO ID subset |
| | Channel Measurement 2 | N$_{taps}$×16 bits | If Aggregation Present field is set to 1, this field is for channel in channel aggregate which does not include the primary channel. If Aggregation Present field is set to 0, this field is not present. Channel measurement for the first TRN-T field or for the channel indicated by the second SISO ID subset |
| | Channel Measurement N$_{meas}$ | N$_{taps}$×16 bits | If Aggregation Present field is set to 1, this field is for channel in channel aggregate which does not include the primary channel. If Aggregation Present field is set to 0, this field is not present. Channel measurement for the N$_{meas}$ TRN-T field or for the channel indicated by the N$_{meas}$ SISO ID subset |

FIG. 19

| Field | | Size | Meaning |
|---|---|---|---|
| Element ID | | 8 bits | Defined in 9.4.2.1 |
| Length | | 8 bits | Defined in 9.4.2.1 |
| Element ID Extension | | 8 bits | Defined in 9.4.2.1 |
| EDMG Sector ID Order | Sector $ID_1$ / $CDOWN_1$ / AWV Feedback $ID_1$ | 11 bits | If Aggregation Present field is set to 1, this field is for channel in channel aggregate which includes the primary channel. If Aggregation Present field is set to 0, this field is for channel which the measurement is taken. |
| | TX Antenna $ID_1$ | 3 bits | |
| | RX Antenna $ID_1$ | 3 bits | |
| | Sector $ID_2$ / $CDOWN_2$ / AWV Feedback $ID_2$ | 11 bits | |
| | TX Antenna $ID_2$ | 3 bits | |
| | RX Antenna $ID_2$ | 3 bits | |
| | ... | ... | |
| | Sector $ID_{Nmeas}$ / $CDOWN_{Nmeas}$ / AWV Feedback $ID_{Nmeas}$ | 11 bits | |
| | TX Antenna $ID_{Nmeas}$ | 3 bits | |
| | RX Antenna $ID_{Nmeas}$ | 3 bits | |
| BRP CDOWN | BRP $CDOWN_1$ | 6 bits | If Aggregation Present field is set to 1, this field is for channel in channel aggregate which includes the primary channel. If Aggregation Present field is set to 0, this field is for channel which the measurement is taken. |
| | BRP $CDOWN_2$ | 6 bits | |
| | ... | ... | |
| | BRP $CDOWN_{Nmeas}$ | 6 bits | |

FIG. 20

| | | | |
|---|---|---|---|
| Tap Delay | Relative Delay Tap #1 | 12 bits | If Aggregation Present field is set to 1, this field is for channel in channel aggregate which includes the primary channel.<br>If Aggregation Present field is set to 0, this field is for channel which the measurement is taken.<br><br>The delay of tap #1 in units of $T_C / N_{CB}$ relative to the path with the shortest delay detected, where $N_{CB}$ is the integer number of contiguous 2.16 GHz channels over which the measurement was taken. |
| | Relative Delay Tap #2 | 12 bits | If Aggregation Present field is set to 1, this field is for channel in channel aggregate which includes the primary channel.<br>If Aggregation Present field is set to 0, this field is for channel which the measurement is taken.<br><br>The delay of tap #2 in units of $T_C / N_{CB}$ relative to the path with the shortest delay detected, where $N_{CB}$ is the integer number of contiguous 2.16 GHz channels over which the measurement was taken. |
| | ... | ... | |
| | Relative Delay Tap #Ntaps | 12 bits | If Aggregation Present field is set to 1, this field is for channel in channel aggregate which includes the primary channel.<br>If Aggregation Present field is set to 0, this field is for channel which the measurement is taken.<br><br>The delay of tap #Ntaps in units of $T_C / N_{CB}$ relative to the path with the shortest delay detected, where $N_{CB}$ is the integer number of contiguous 2.16 GHz channels over which the measurement was taken. |
| (Additional) EDMG Sector ID Order | Sector $ID_1$ / $CDOWN_1$ / AWV Feedback $ID_1$ | 11 bits | If Aggregation Present field is set to 1, this field is for channel in channel aggregate which does not include the primary channel.<br>If Aggregation Present field is set to 0, this field is not present. |
| | TX Antenna $ID_1$ | 3 bits | |
| | RX Antenna $ID_1$ | 3 bits | |
| | Sector $ID_2$ / $CDOWN_2$ / AWV Feedback $ID_2$ | 11 bits | |
| | TX Antenna $ID_2$ | 3 bits | |
| | RX Antenna $ID_2$ | 3 bits | |
| | ... | ... | |
| | Sector $ID_{Nmeas}$ / $CDOWN_{Nmeas}$ / AWV Feedback $ID_{Nmeas}$ | 11 bits | |
| | TX Antenna $ID_{Nmeas}$ | 3 bits | |
| | RX Antenna $ID_{Nmeas}$ | 3 bits | |
| (Additional) BRP CDOWN | BRP $CDOWN_1$ | 6 bits | If Aggregation Present field is set to 1, this field is for channel in channel aggregate which does not include the primary channel.<br>If Aggregation Present field is set to 0, this field is not present. |
| | BRP $CDOWN_2$ | 6 bits | |
| | ... | ... | |
| | BRP $CDOWN_{Nmeas}$ | 6 bits | |

FIG. 21

| (Additional) Tap Delay | Relative Delay Tap #1 | 12 bits | If Aggregation Present field is set to 1, this field is for channel in channel aggregate which does not include the primary channel. If Aggregation Present field is set to 0, this field is not present. |
|---|---|---|---|
| | Relative Delay Tap #2 | 12 bits | |
| | ... | ... | |
| | Relative Delay Tap #Ntaps | 12 bits | |

FIG. 25

| Field | Size (bits) | Meaning |
|---|---|---|
| Element ID | 8 | |
| Length | 8 | |
| Element ID Extension | 8 | |
| SU / MU | 1 | Sets to 1 to indicate SU-MIMO beamforming and sets to 0 to indicate MU-MIMO beamforming. |
| EDMG Group ID | 8 | Indicates the EDMG Group ID of target MU group. This field is reserved when the SU / MU field is set to 1. |
| Group User Mask | 32 | |
| DL / UL MU-MIMO Phase | 1 | Set to 1 to indicate downlink MIMO phase and sets to 0 to indicate uplink MIMO phase. This field is reserved when the SU / MU field is set to 1. |
| L-TX-RX | 8 | Indicates the requested number of consecutive TRN-Units in which the same AWV is used in the transmission of the last M TRN subfields of each TRN-Unit. This field is reserved when the SU / MU field is set to 0. |
| Requested EDMG TRN-Unit M | 4 | The value of this field plus one indicates the requested number of TRN subfields in a TRN-Unit transmitted with the same AWV following a possible AWV change. This field is reserved when the SU / MU field is set to 0. |
| Link Type | 1 | Sets to 1 to indicate initiator link and set to 0 otherwise. This field shall be set to 1 when the SU / MU field is set to 0. |
| MIMO FBCK-REQ | 10 | Indicates channel measurement feedback requested for link specified by the Link Type field. |

FIG. 26

| Channel Measurement Requested | Number of Taps Requested | Number of TX Sector Combinations Requested | Aggregation Requested |
|---|---|---|---|
| 1 | 2 | 6 | 1 |

Bits:

FIG. 27

| Field | Size (bits) | Meaning |
|---|---|---|
| Element ID | 8 | |
| Length | 8 | |
| Element ID Extension | 8 | |
| SU / MU | 1 | Sets to 1 to indicate SU-MIMO beamforming and sets to 0 to indicate MU-MIMO beamforming. |
| Link Type | 1 | Sets to 1 to indicate initiator link and set to 0 otherwise. This field shall be set to 1 when the SU / MU field is set to 0. |
| MIMO FBCK-TYPE | 11 | |

FIG. 28

| Channel Measurement Present | Tap Delay Present | Number of Taps Present | Number of TX Sector Combinations Present | Aggregation Present |
|---|---|---|---|---|
| 1 | 1 | 2 | 6 | 1 |

Bits:

METHOD FOR SUPPORTING BEAMFORMING IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/004233, filed on Apr. 11, 2018, which claims the benefit of U.S. Provisional Application No. 62/553,138, filed on Sep. 1, 2017, 62/554,587, filed on Sep. 6, 2017, and 62/564,267, filed on Sep. 28, 2017, the contents of which are all hereby incorporated by reference herein in their entirety.

BACKGROUND

Field

The following description relates to a method and a device for supporting beamforming for signal transmission between stations in a wireless local area network (WLAN) system.

More specifically, the following description relates to a method and a device for supporting beamforming training for two aggregated channels.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY

The present disclosure proposes a method and a device for supporting beamforming between stations for signal transmission via two aggregated channels.

One aspect of the present disclosure proposes a method for supporting, by a first station (STA), beamforming with a second STA in a wireless local area network (WLAN) system, the method including: transmitting, to the second STA, a first frame to request beamforming training for two aggregated channels; transmitting a beam refinement protocol (BRP) packet including a Training field to the second STA; and receiving, from the second STA, a second frame including feedback information measured for each of the two aggregated channels based on the BRP packet including the Training field, and indicating that the feedback information is channel information measured for each of the two aggregated channels.

Another aspect of the present disclosure proposes a station device for supporting beamforming in a WLAN system, the station device including: a transceiver configured to have one or more radio frequency (RF) chains and to transmit and receive a signal to and from another station device; and a processor configured to be connected to the transceiver and to process a signal transmitted to and received from the other station device, wherein the processor is configured to: transmit, to the second STA, a first frame to request beamforming training for two aggregated channels; transmit a BRP packet including a Training field to the second STA; and receive, from the second STA, a second frame including feedback information measured for each of the two aggregated channels based on the BRP packet including the Training field, and indicating that the feedback information is channel information measured for each of the two aggregated channels.

In this configuration, the two aggregated channels may be two channels on a 2.16 GHz band/channel or two channels on a 4.32 GHz band/channel.

The first frame and the second frame may not include a Training field.

The feedback information may include signal-to-noise ratio (SNR) information, channel measurement information, enhanced directional multi-gigabit (EDMG) sector identity (ID) information, BRP countdown (CDOWN) information, and tap delay information per channel, which are measured for the two aggregated channels.

The SNR information and the channel measurement information per channel, which are measured for the two aggregated channels, may be transmitted via a channel measurement feedback element included in the second frame, and the EDMG sector identity ID information, the BRP CDOWN information, and the tap delay information per channel, which are measured for the two aggregated channels, may be transmitted via an EDMG channel measurement feedback element included in the second frame.

According to one applicable example of the present disclosure, the first frame may correspond to a first BRP frame in which an Aggregation Requested field in a directional multi-gigabit (DMG) beam refinement element is set to 1.

Here, the first STA may receive, from the second STA, a second BRP frame in which an Aggregation Requested field in a DMB beam refinement element is set to 1 in response to the first BRP frame.

Also, the second frame may correspond to a third BRP frame in which an Aggregation Present field in the DMB beam refinement element is set to 1.

According to another applicable example of the present disclosure, the first frame may correspond to a first multiple input multiple output (MIMO) beamforming setup frame that includes a Single User (SU)/Multi-User (MU) field set to 1, a Link Type field set to 1, and an Aggregation Requested field set to 1.

Here, the first STA may receive, from the second STA, a second MIMO beamforming setup frame that includes a SU/MU field set to 1, a Link Type field set to 0, and an Aggregation Requested field set to 1 in response to the first MIMO beamforming setup frame.

Further, the second frame may correspond to a third MIMO beamforming feedback frame in which an Aggregation Present field in a MIMO feedback control element is set to 1.

According to still another applicable example of the present disclosure, the first frame may correspond to a MIMO beamforming setup frame that includes a SU/MU field set to 0 and an Aggregation Requested field set to 1.

Here, the second frame may correspond to a MIMO beamforming feedback frame in which an Aggregation Present field in a MIMO feedback control element is set to 1.

Still another aspect of the present disclosure proposes a method for supporting, by a first STA, beamforming with a second STA in a WLAN system, the method including: receiving, from the second STA, a first frame to request beamforming training for two aggregated channels; receiving a BRP packet including a Training field from the second STA; performing channel measurement about the two aggregated channels based on the BRP packet including the Training field; and transmitting, to the second STA, a second frame including feedback information measured for each of the two aggregated channels based on the BRP packet including the Training field, and indicating that the feedback information is channel information measured for each of the two aggregated channels.

Yet another aspect of the present disclosure proposes a station device for supporting beamforming in a WLAN system, the station device including: a transceiver configured to have one or more RF chains and to transmit and receive a signal to and from another station device; and a processor configured to be connected to the transceiver and to process a signal transmitted to and received from the other station device, wherein the processor is configured to: receive, from the second STA, a first frame to request beamforming training for two aggregated channels; receive a BRP packet including a Training field from the second STA; perform channel measurement about the two aggregated channels based on the BRP packet including the Training field; and transmit, to the second STA, a second frame including feedback information measured for each of the two aggregated channels based on the BRP packet including the Training field, and indicating that the feedback information is channel information measured for each of the two aggregated channels.

The effects of the present disclosure will not be limited only to the effects described above. Accordingly, effects that have not been mentioned above or additional effects of the present application may become apparent to those having ordinary skill in the art from the description presented below.

With the foregoing configuration, a station according to the present disclosure can obtain measurement information about each of two aggregated channels and can support (or perform) optimal beamforming for each of the aggregated channel based on the measurement information.

The effects of the present disclosure will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present disclosure and are incorporated in and constitute a part of this application, illustrate embodiments of the disclosure and serve to explain the principle of the disclosure along with the description of the present disclosure.

FIG. 9 is a diagram showing a PPDU structure that can be applied to the present disclosure.

FIG. 16 is a diagram schematically illustrating the configuration of a DMG Beam Refinement element that is applicable to the present disclosure.

FIGS. 17 and 18 are diagrams illustrating a channel measurement feedback element that is applicable to the present disclosure.

FIGS. 19 to 21 are diagrams illustrating an EDMG channel measurement feedback element that is applicable to the present disclosure.

FIG. 25 is a diagram illustrating a MIMO Setup Control element applicable to the present disclosure, and FIG. 26 is a diagram illustrating the configuration of a MIMO FBCK-REQ field included in the MIMO Setup Control element applicable to the present disclosure.

FIG. 27 is a diagram illustrating a MIMO Feedback Control element applicable to the present disclosure, and FIG. 28 is a diagram illustrating the configuration of a MIMO FBCK-TYPE field included in the MIMO Feedback Control element applicable to the present disclosure.

DESCRIPTION OF EXEMPLARY EMBODIMENTS

Hereinafter, the preferred embodiment of the present disclosure will be described in detail with reference to the appended drawings. The detailed description that will hereinafter be disclosed along with the appended drawings will only be provided to describe an exemplary embodiment of the present disclosure. And, therefore, it should be understood that the exemplary embodiment presented herein will not represent the only embodiment for carrying out the present disclosure.

The following detailed description includes specific details for providing a full understanding of the present disclosure. However, it will be apparent to anyone skilled in the art that the present disclosure can be carried out without referring to the above-mentioned specific details. In some cases, in order to avoid any ambiguity in the concept of the present disclosure, the disclosed structure and device may be omitted, or the disclosed structure and device may be illustrated as a block diagram based on their core functions.

Although diverse mobile communication systems applying the present disclosure may exist, a wireless LAN (WLAN) system will hereinafter be described in detail as an example of such mobile communication system.

1. Wireless LAN (WLAN) System 1-1. General Wireless LAN (WLAN) System

Figure 1:
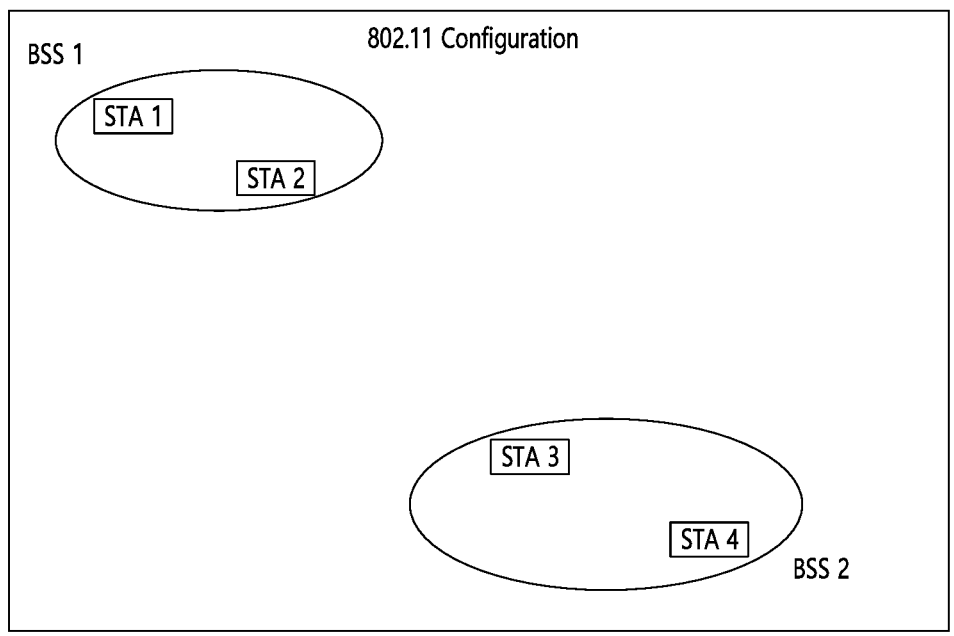
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, a STA includes an access point (AP) and a non-AP Station. Among the STAs, a portable device (or terminal) that is operated by a user corresponds to a non-AP Station. And, therefore, when an entity is simply mentioned to as a STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
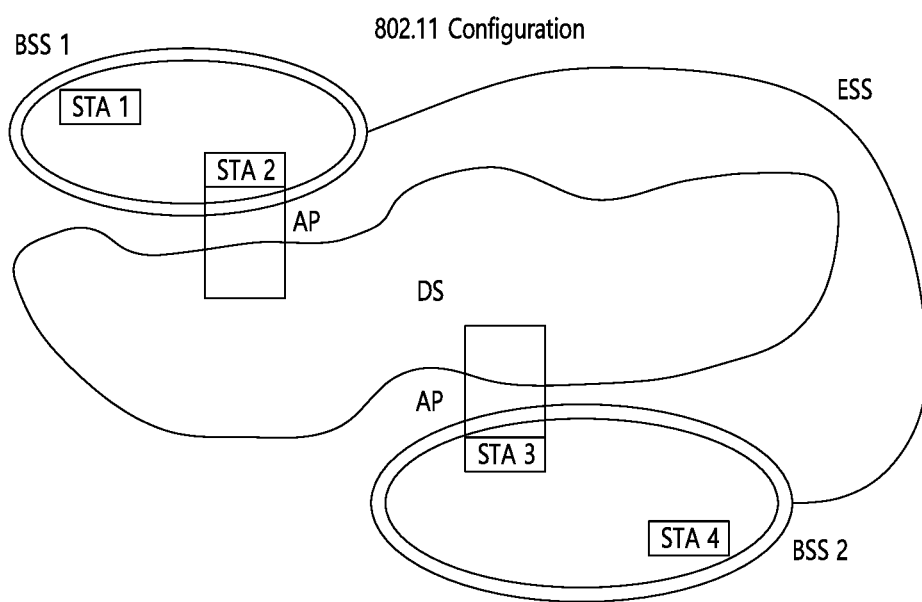
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2 Channel Bonding in a Wireless LAN (WLAN) System

Figure 3:
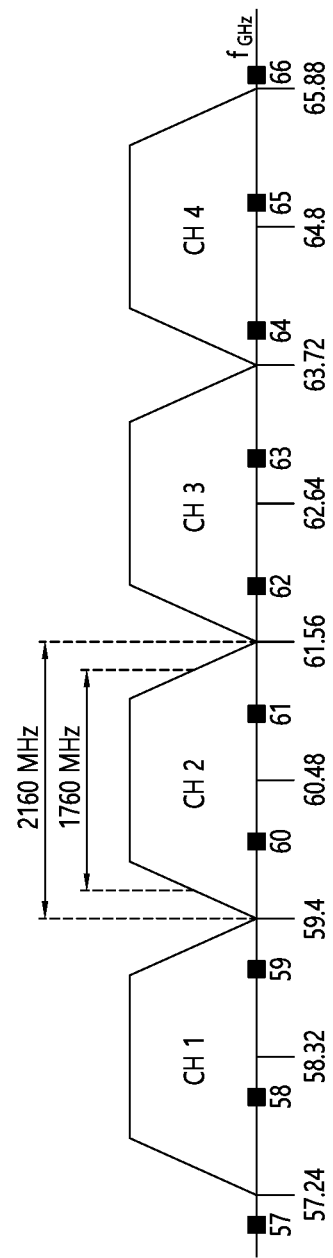
FIG. 3 is a diagram describing a channel in a 60 GHz band for describing a channel bonding operation according to an exemplary embodiment of the present disclosure.

FIG. 3 is a diagram describing a channel in a 60 GHz band for describing a channel bonding operation according to an exemplary embodiment of the present disclosure.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel Channel 2 and Channel 3 may be used is most regions excluding Australia. And, accordingly, Channel 2 and Channel 3 may be used for channel bonding. However, it shall be understood that diverse channels may be used for channel bonding. And, therefore, the present disclosure will not be limited to only one or more specific channels.

Figure 4:
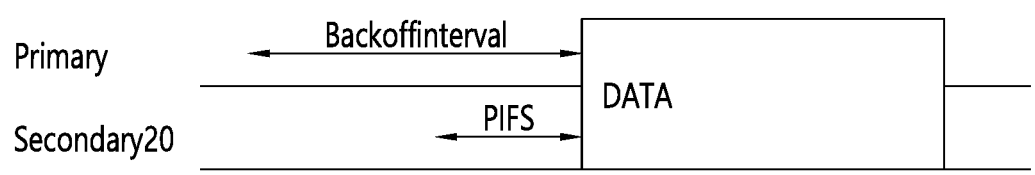
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present disclosure, a solution (or method) for performing scheduling-based access by having the AP transmit scheduling information to the STAs is proposed. Meanwhile, in another aspect of the present disclosure, a solution (or method) for performing contention-based channel access based on the above-described scheduling or independently from the above-described scheduling is proposed. Furthermore, in yet another aspect of the present disclosure, a method for performing communication through a spatial sharing technique based on beamforming is proposed.

1-3. Beacon Interval Configuration

Figure 5:
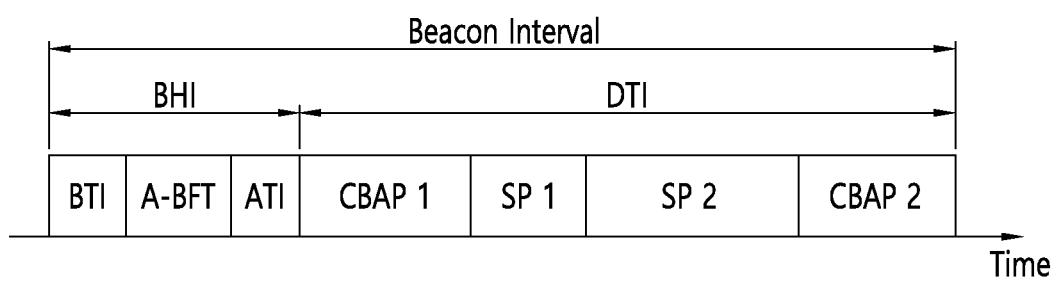
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by a STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present disclosure is not necessarily required to be limited only to this.

Hereinafter, a physical layer configuration in a wireless LAN (WLAN) system, in which the present disclosure is to be applied, will be described in detail.

1-4. Physical Layer Configuration

It will be assumed that the wireless LAN (WLAN) system according to an exemplary embodiment of the present disclosure may provide 3 different modulations mode as shown below.

TABLE 1

| PHY | MCS | Note |
| --- | --- | --- |
| Control PHY | 0 | |
| Single carrier PHY (SC PHY) | 1 ... 12<br>25 ... 31 | (low power SC PHY) |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
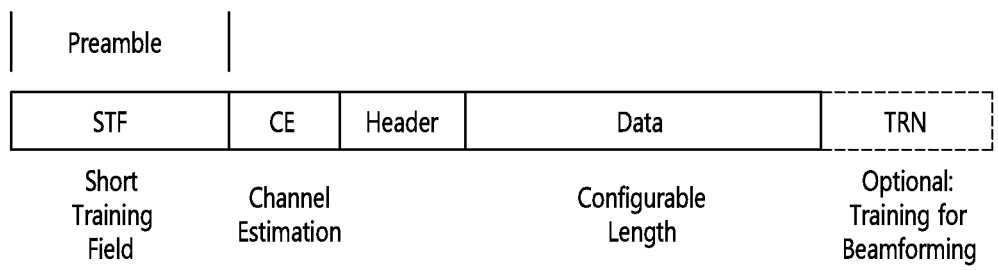
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
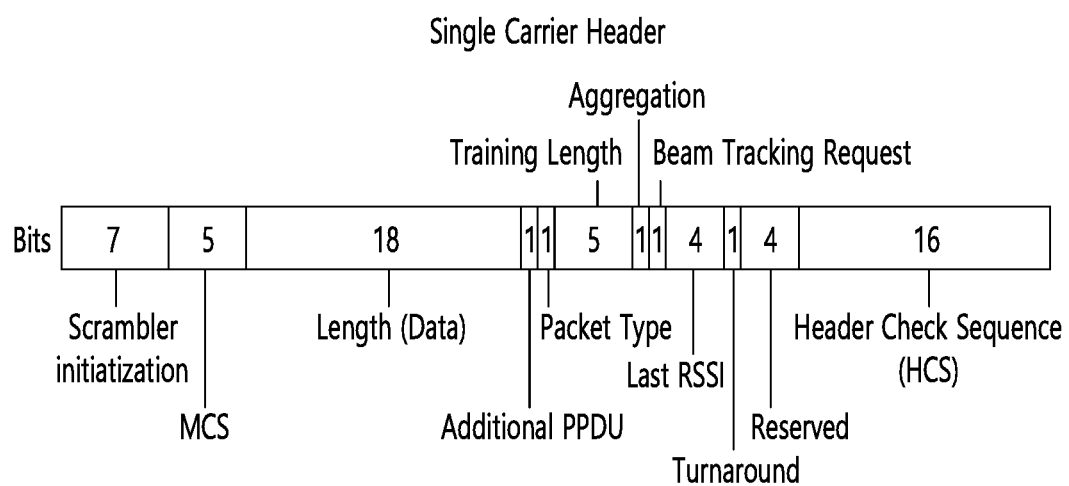
FIG. 7 and FIG. 8 are diagrams describing a configuration of a header field of the radio frame shown in FIG. 6.
Figure 8:
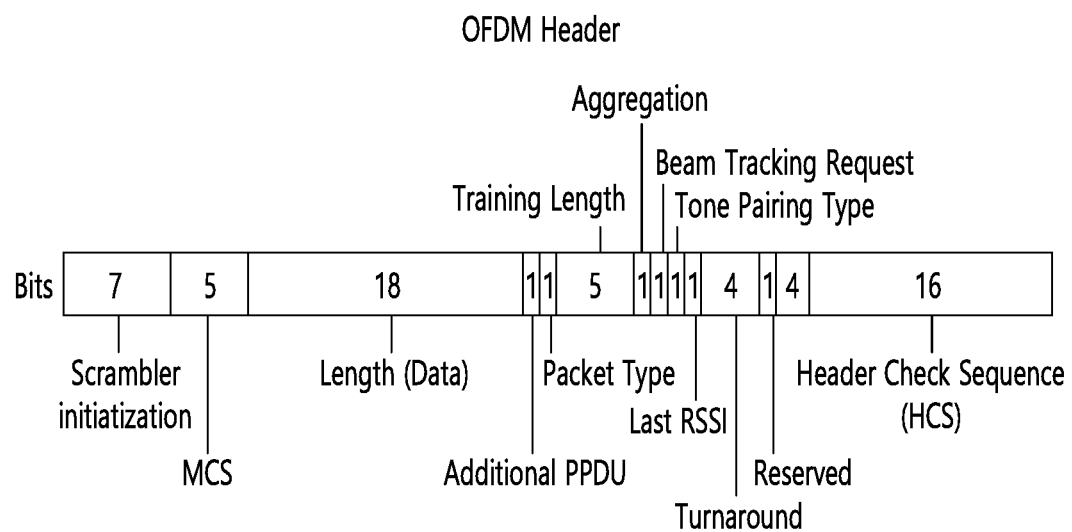

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present disclosure. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present disclosure, it may be considered to perform the transmission (gap filling) of a new STF and CE field along with the legacy preamble at the same time through the 400 MHz band between each channel.

In this case, as shown in FIG. 9, the PPDU structure according to the present disclosure has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
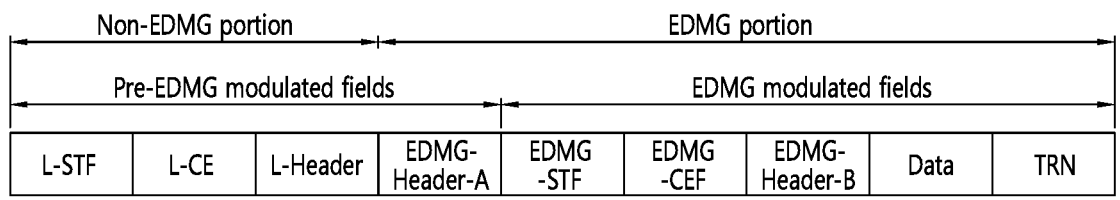
FIG. 10 is a diagram showing a simple PPDU structure that can be applied to the present disclosure.

FIG. 10 is a diagram showing a simple PPDU structure that can be applied to the present disclosure. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the above-described PPDU may be used for packet detection, Automatic Gain Control (AGC), frequency offset estimation, synchronization, indication of modulation (SC or OFDM), and channel estimation. A format of the preamble may be common to both OFDM packets and SC packets. Herein, the preamble may be configured of a Short Training Field (STF) and a Channel Estimation (CE) field that is positioned after the STF field.

3. Embodiments Applicable to the Present Disclosure

The 11ay system, to which the present disclosure is applicable, supports channel bonding, channel aggregation, and single-user/multiple-user multiple input multiple output (SU/MU-MIMO) in order to support a high data rate. In particular, it is defined that the 11ay system needs to support at least 28 Gbps for a wireless TV, which is a usage model requiring the highest data rate.

Figure 11:
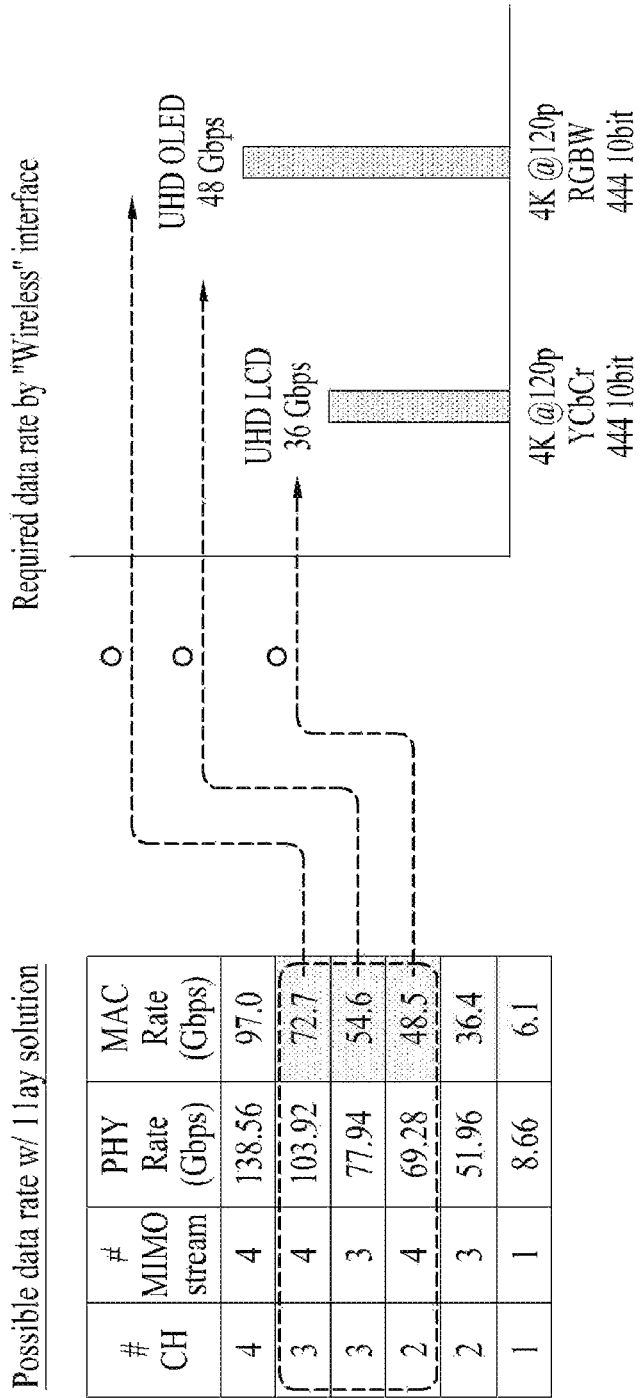
FIG. 11 is a diagram illustrating a data rate required by a wireless TV to which the present disclosure is applicable.

FIG. 11 is a diagram illustrating a data rate required by a wireless TV to which the present disclosure is applicable.

In FIG. 11, a left table shows the maximum PHY rate according to the number of bonded channels and the number of spatial streams in a case where a short guard interval (GI) is used on a single-carrier basis and a code rate of 7/8 is used for pi/2-64 quadrature amplitude modulation (QAM) in the 11-ay system. Also, on the left table, the MAC rate is an example in a case where efficiency is determined to be 70% compared to the PHY rate considering overhead. This efficiency value may be changed depending on the MAC efficiency.

Referring to a right diagram of FIG. 11, bonding of at least two channels and at least four streams need to be used so that a required level for a UHD LCD meets a transmission rate required by a 4K UHD LCD TV, and bonding of at least three channels and at least three streams need to be used so that a required level for a UHD OLED meets a transmission rate required by a 4K OLED TV.

However, it may be difficult to use bonding of three or four contiguous channels due to each country's policy on frequency or other neighboring devices using an overlapping basic service set (OBSS) or an unlicensed band.

In addition, using bonding of three or four channels requires a radio frequency (RF) chain of high complexity. For example, 2.16 GHz*a sampling rate of 3 or higher and resulting power consumption are required for a digital-analog converter (DAC)/analog-digital converter (ADC), in which case a phase shifter and an antenna for beamforming need to have linear characteristics over the entire bandwidth.

To alleviate these requirements, channel aggregation is introduced to the 11ay system to which the present disclosure is applicable. Here, the channel aggregation may also support non-contiguous channel aggregation.

More specifically, the channel aggregation includes channel aggregation of 2.16 GHz+2.16 GHz or 4.32 GHz+4.32 GHz. Here, the channel aggregation of 2.16 GHz+2.16 GHz can be implemented using two RF chains of one-channel bonding, and channel aggregation of 4.32 GHz+4.32 GHz can be implemented using two RF chains of two-channel bonding. To this end, a single channel and two-channel bonding are mandatorily defined in the 11ay system to which the present disclosure is applicable.

When the distance between an AP and a STA is short (or the distance between STAs is short in a peer-to-peer (P2P) case), it may be difficult to establish a scattering environment, and it may be difficult to transmit a signal through a multi-stream due to a high correlation between radio channels. In addition, due to the size of a device, it may be difficult to install a plurality of antennas in the device. In this case, when an antenna is arranged for each frequency channel in the above-described channel aggregation situation, a large number of antennas are required, causing a tight constraint on antenna arrangement.

Also, in the 11ay system to which the present disclosure is applicable, a STA performs sector sweeping for each antenna for MIMO beamforming, which may cause latency.

Figure 12:
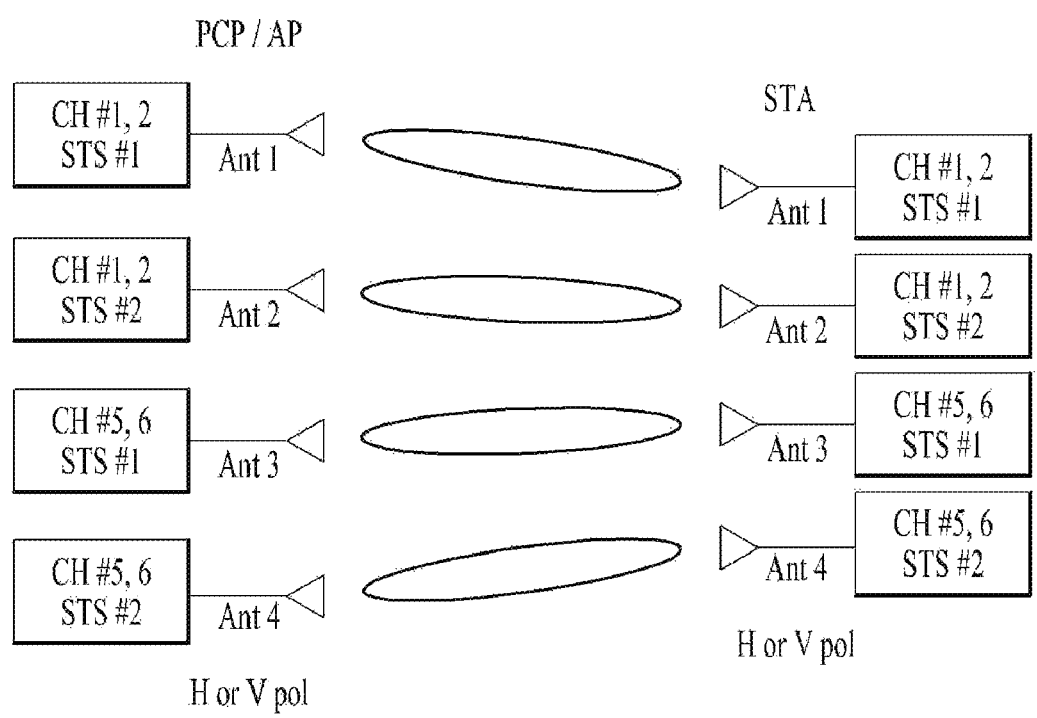
FIGS. 12 and 13 are diagrams illustrating a method of transmitting and receiving a signal between a STA and an AP in channel aggregation.
Figure 13:
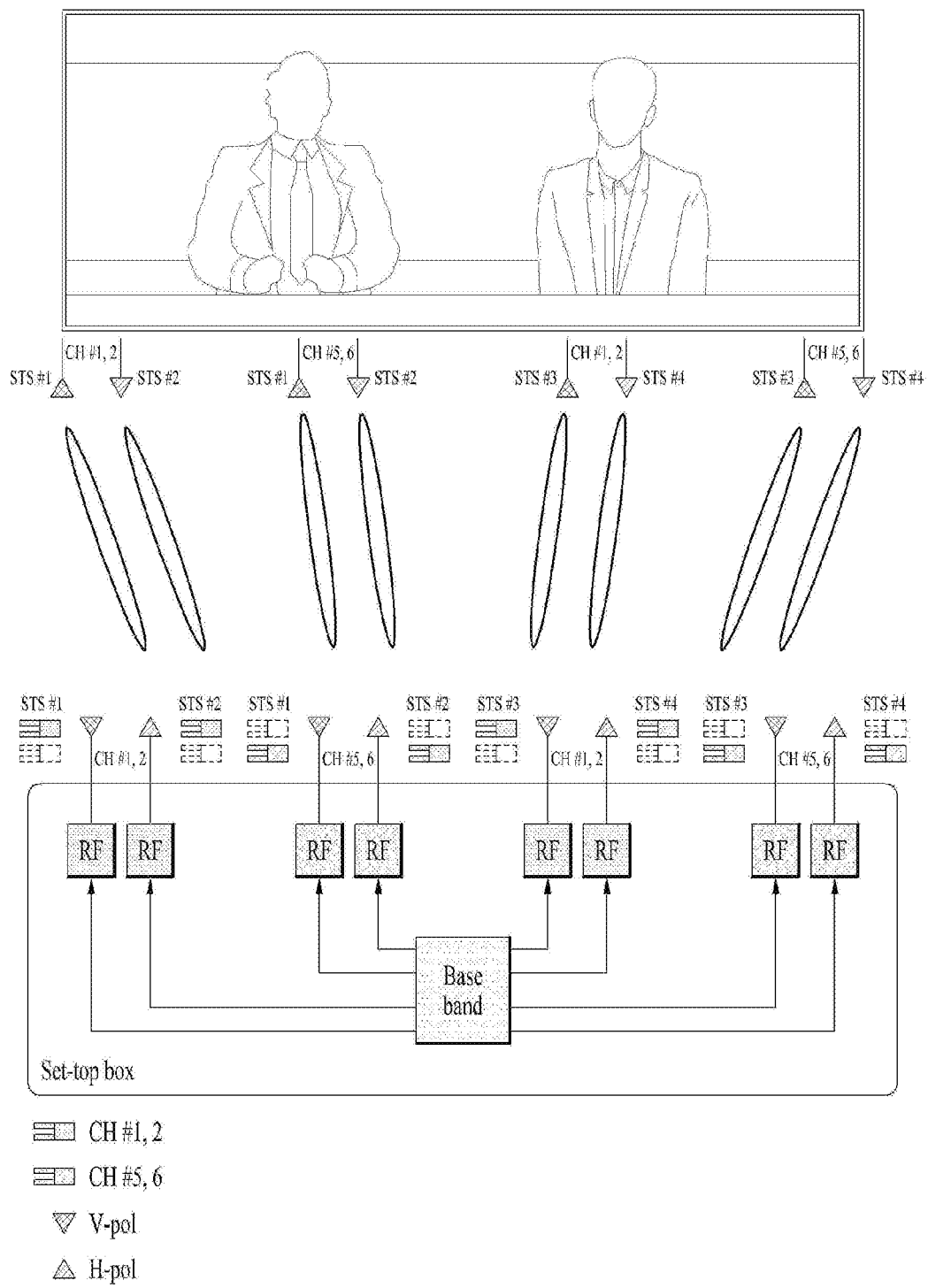

FIGS. 12 and 13 are diagrams illustrating a method of transmitting and receiving a signal between a STA and an AP in channel aggregation.

Although it is assumed in FIGS. 12 and 13 that direct conversion is applied, an intermediate frequency (IF) technique may be used instead of this configuration. In addition, when a polarization antenna is used as in FIG. 13, interference between inter-streams may be avoided. Thus, the polarization antenna can be positively utilized in a MIMO implementation method.

Further, in FIGS. 12 and 13, it is assumed that each RF chain and each antenna have a bandwidth (BW) of 4.32 GHz. Accordingly, each antenna can transmit and receive a signal corresponding to each channel (4.32 GHz) in channel aggregation of 4.32 GHz+4.32 GHz.

FIGS. 12 and 13 illustrate a method of arranging antennas as far as possible in order to avoid interference between inter-streams. Accordingly, other antenna arrangements may also be considered together in view of this aspect.

As shown in FIGS. 12 and 13, the directions of optimal signals transmitted from the respective antennas may be different from each other. That is, the signal transmission and reception directions of the respective channels need to be configured different in order to support optimal signal transmission and reception.

In a conventional system, respective antennas are defined to enable signal transmission and reception in different directions, while measurement and feedback on the antennas are defined only for the entire bandwidth over which a PPDU is transmitted. That is, according to the conventional system, it is impossible to provide measurement and feedback on an optimal beam direction of an antenna that transmits and receives a signal only through a single channel.

Therefore, the present disclosure describes in detail a specific signal transmission and reception method capable of supporting measurement and feedback on signal transmission and reception in different directions for respective channels that are aggregated.

3.1. Beam Refinement Protocol Transmit Sector Sweep (BRP TXSS)

Figure 14:
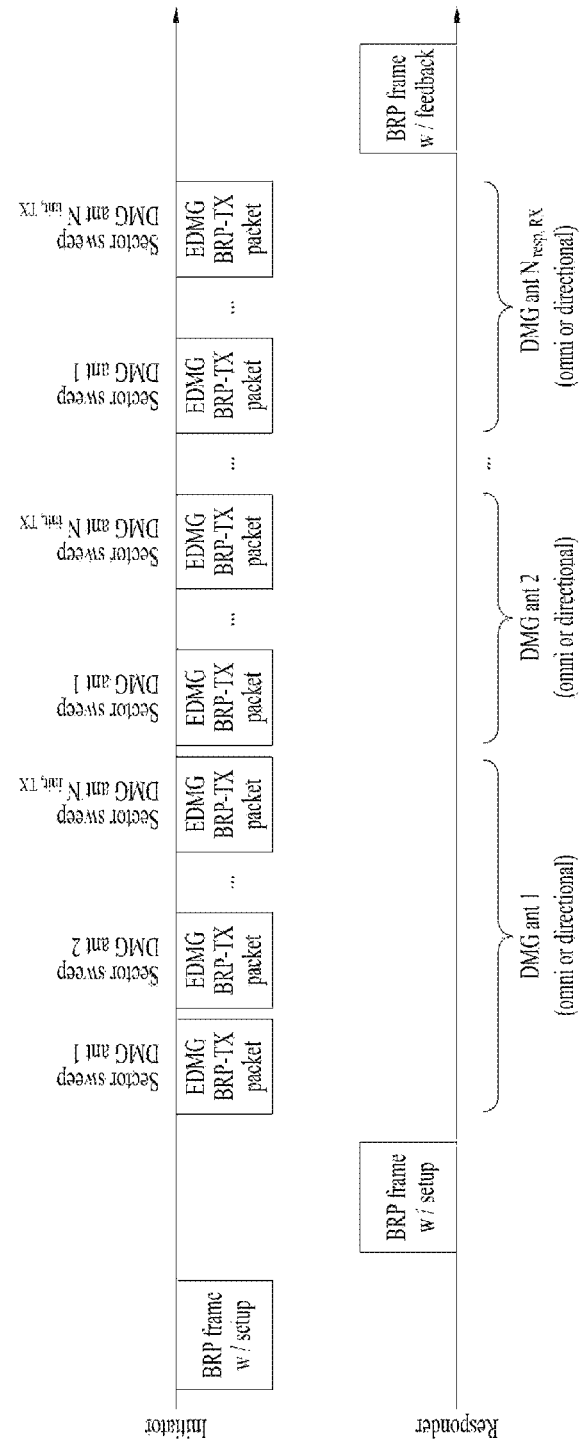
FIG. 14 is a diagram schematically illustrating a BRP TXSS operation according to an exemplary embodiment of the present disclosure.

FIG. 14 is a diagram schematically illustrating a BRP TXSS operation according to an exemplary embodiment of the present disclosure.

A BRP TXSS is a procedure for performing a transmit sector sweep using a BRP frame, (performing receive training) and determining an enhanced antenna configuration for transmission.

In the BRP TXSS, a STA performing the procedure by transmitting a BRP frame is referred to as an initiator, and a STA participating in the BRP TXSS, together with the initiator, and receiving the BRP frame is referred to as a responder.

In the BRP TXSS, a set of transmit antenna weight vectors (AWVs) is tested against a quasi-omnidirectional receive pattern for all possible combinations of transmit DMG antennas and receive DMG antennas. The total number of AWV combinations trained is thus given by the sum of all sectors employed on all DMG antennas of the initiator multiplied by the number of DMG antennas of the responder.

FIG. 14 illustrates an example of a BRP TXSS applicable to the present disclosure. In FIG. 14, $N_{init,TX}$ denotes the number of transmit DMG antennas of an initiator, and $N_{resp,RX}$ denotes the number of receive DMG antennas of a responder.

The BRP TXSS starts with the transmission of a BRP frame which indicates the need for a transmit sector sweep by the initiator. After receiving confirmation of a BRP TXSS request from the responder, the initiator transmits an EDMG BRP-TX packet to perform a transmit sector sweep using the DMG antennas of the initiator. This process is repeated for each DMG antenna of the receiver. The last packet of the BRP TXSS includes feedback of the corresponding procedure based on measurement performed by the responder during the reception of the EDMG BRP-TX packet. A feedback type is defined in the BRP frame that starts the procedure (e.g., the BRP TXSS).

In the BRP TXSS, a receive antenna pattern utilized by the responder in the reception of a TRN field of the EDMG BRP-TX packet may be quasi-omnidirectional or directional. The receive antenna pattern to be utilized by the responder is determined in the BRP frame that starts the procedure.

The TRN field in the EDMG BRP packets is transmitted as part of the BRP TXSS over the entire channel bandwidth. Therefore, the BRP TXSS allows for a transmit sector sweep over the entire channel bandwidth when the initiator and the responder operate on not only a channel of 4.32 GHz, 6.48 GHz or 8.64 GHz but also a channel of 2.16+2.16 GHz or 4.32+4.32 GHz.

In this configuration, the configurations of the DMG antennas and TRN-units used for the BRP TXSS may be defined as follows.

All fields, except for the TRN field of the EDMG BRP-TX packet, used in the BRP TXSS may be transmitted with the same DMG antenna and the same antenna configuration as those used in the transmission of the BRP frame that starts the BRP TXSS procedure. The TRN field of the EDMG BRP-TX packet used in the BRP TXSS may be transmitted via a DMG antenna that is different from that used in the transmission of the remaining fields of the same EDMG BRP-TX packet.

All fields, except for the TRN field of the EDMG BRP-TX packet, used in the BRP TXSS may be received with the same DMG antenna and the same antenna configuration as those used in the reception of the BRP frame that starts the BRP TXSS procedure. The TRN field of the EDMG BRP-TX packet used in the BRP TXSS may be received via a DMG antenna that is different from that used in the reception of the remaining fields of the same EDMG BRP-TX packet. The TRN field of the EDMG BRP-TX packet used in the BRP TXSS may be received with either a quasi-omnidirectional receive pattern or a directional antenna pattern.

If a TXSS-REQ-RECIPROCAL subfield in an EDMG BRP Request element of the BRP frame transmitted by the initiator to start the BRP TXSS is equal to 0;

The total number of trained AWV combinations is equal to the sum of all sectors employed on all DMG antennas of the initiator multiplied by the number of all DMG antennas of the responder.

The responder may use a quasi-omnidirectional pattern when receiving the TRN field of the EDMG BRP-TX packet used in the procedure.

The TXSS-REQ-RECIPROCAL subfield in an EDMG BRP Request element of the BRP frame transmitted by the initiator to start the BRP TXSS may be set to 1 only if:

An Antenna Pattern Reciprocity subfield in a DMG STA Capability Information field of the responder and an Antenna Pattern Reciprocity subfield in a DMG STA Capability Information field of the initiator are both equal to 1; and The last BRP TXSS performed between a BRP frame transmitter (that is, the initiator in a recent BRP TXSS) and a BRP frame receiver (that is, the responder in a recent BRP TXSS) is performed with a BRP frame transmitter serving as a responder and a BRP frame receiver serving as an initiator.

If the TXSS-REQ-RECIPROCAL subfield in an EDMG BRP Request element of the BRP frame transmitted by the initiator to start the BRP TXSS is equal to 0;

The initiator may transmit the EDMG BRP-TX packet using a DMG antenna corresponding to the best sector identified in the last BRP TXSS procedure performed between two STAs and initiated by a responder of a recent BRP TXSS procedure.

The responder may use a directional antenna pattern when receiving the EDMG BRP-TX packet transmitted by the initiator. An AWV used by the responder may be the best sector identified in the last BRP TXSS procedure performed between two STAs and initiated by the responder of the recent BRP TXSS procedure.

The BRP packet transmitted, along with feedback on the BRP TXSS, by the responder may be transmitted with the same DMG antenna and the same antenna configuration as used in the transmission of the first BRP frame transmitted by the responder in the BRP TXSS procedure. The BRP packet transmitted, along with the feedback on the BRP TXSS, by the responder may be received with the same DMG antenna and the same antenna configuration as used in the reception of the first BRP frame transmitted by the responder in the BRP TXSS procedure.

The first TRN-unit in the EDMG BRP packet used in the BRP TXSS may be used to switch the DMG antennas of the initiator and the responder and may not be processed by the responder. Therefore, for the EDMG BRP-TX packet transmitted during the BRP TXSS, the value of TXVECTOR parameter EDMG_TRN_LEN may be set to k+1, where k is the number of TRN-units used for a sector sweep. The TRN subfield including the first TRN-unit in the EDMG BRP-TX packet used as part of the BRP TXSS may not be included in the TRN subfield (for AWV training) and an AWV feedback ID indexing procedure.

When transmitting an EDMG BRP-TX packet as part of a BRP TXSS, an EDMG STA may change a DMG antenna used in the transmission of a TRN field during the first TRN-unit and may not change the DMG antenna during the remaining TRN-units.

When receiving an EDMG BRP-TX packet as part of BRP TXSS, the EDMG STA may change a DMG antenna used in the reception of a TRN field during the first TRN-unit and may not change the DMG antenna during the remaining TRN-units.

For the EDMG BRP-TX packet used in the BRP TXSS, an AWV used in the transmission of the first P TRN subfield of each TRN-unit depends on whether a DMG antenna used in the transmission of the EDMG BRP-TX packet is changed at the beginning of the TRN field. If the TRN field of the EDMG BRP-TX packet is transmitted via the same DMG antenna as used for the remaining fields of the packet, the first P TRN subfields of the respective TRN-units may be transmitted using the same AWV as used for the remaining fields of the packet. If the DMG antenna used in the transmission of the EDMG BRP-TX packet is changed at the beginning of the TRN field, an AWV used in the transmission of the first P TRN subfields of the respective TRN-units may be selected in an implementation-dependent manner and may be the same for all the TRN-units.

A BRP frame exchange is used to initiate a BRP TXSS procedure and to negotiate beamforming training parameters.

The initiator starts a BRP TXSS procedure by transmitting a BRP frame in which a TXSS-REQ field in an EDMG BRP Request element is set to 1 and a TXSS-SECTORS field is set to indicate the total number of transmit sectors used by the initiator in the BRP TXSS procedure over all the combined DMG antennas. A FBCK-REQ subfield in a DMG Beam Refinement element transmitted via the BRP frame may be set to 10001 (binary).

In channel aggregation, an Aggregation Requested field in the DMG Beam Refinement element transmitted via the BRP frame may be set to 1.

Figure 15:
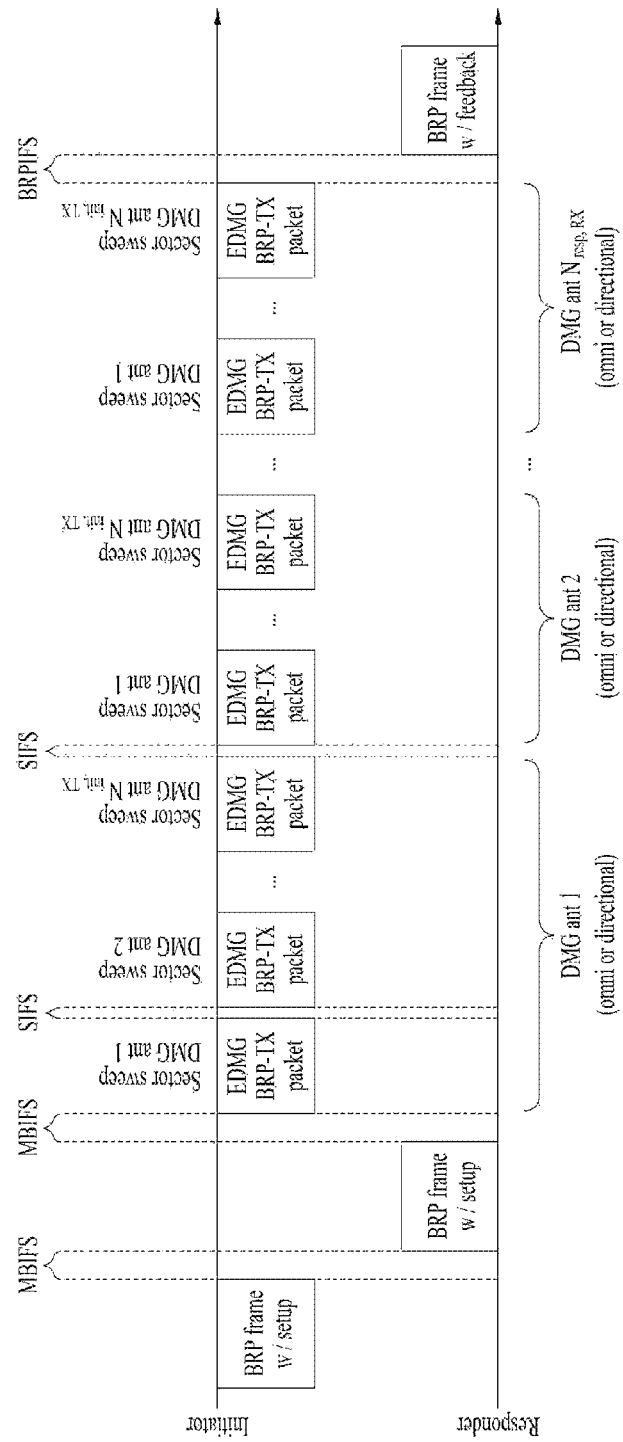
FIG. 15 is a diagram schematically illustrating a BRP TXSS operation according to another exemplary embodiment of the present disclosure.

FIG. 15 is a diagram schematically illustrating a BRP TXSS operation according to another exemplary embodiment of the present disclosure.

As illustrated in FIG. 15, to confirm the execution of a BRP TXSS, a responder may respond with a BRP frame, in which a BRP-TXSS-OK subfield in a DMG Beam Refinement element is set to 1, after medium beamforming interframe spacing (MBIFS) from the time the first BRP frame is received.

In channel aggregation, an Aggregation Requested field in the DMG Beam Refinement element transmitted via the BRP frame may be set to 1.

An initiator may transmit the first EDMG BRP-TX packet as part of the BRP TXSS after MBIFS from the time of the reception of the BRP frame transmitted by the responder confirming the execution of the BRP TXSS.

The BRP frame transmitted by the initiator to initiate the BRP TXSS procedure and the BRP frame transmitted by the responder to confirm the execution of the BRP TXSS may not include a TRN field.

If a TXSS-REQ-RECIPROCAL subfield in an EDMG BRP Request element of the BRP frame transmitted to initiate the BRP TXSS is 0, the initiator may transmit $N_{init,TX}$ EDMG BRP-TX packets for each DMG antenna for the responder. The total number of sectors trained in the $N_{init,TX}$ EDMG BRP-TX packets is N, where N is equal to the value of a TXSS-SECTORS subfield in the EDMG BRP Request element transmitted via the BRP frame to start the BRP TXSS procedure. If the responder has more than one receive DMG antenna, the initiator repeats the transmission of the $N_{init,TX}$ EDMG BRP-TX packets for the number of finally negotiated DMG antennas indicated in a Number of RX DMG Antennas field transmitted by the responder to the initiator.

If the TXSS-REQ-RECIPROCAL subfield in the EDMG BRP Request element of the BRP frame transmitted to initiate the BRP TXSS is 1, the initiator may transmit an EDMG BRP-TX packet to the responder. The total number of sectors trained in the packet is N, where N is equal to the value of the TXSS-SECTORS subfield in the EDMG BRP Request element transmitted via the BRP frame to start the procedure.

The EDMG BRP-TX packets transmitted by the initiator in the BRP TXSS procedure may be separated at an interval of short interframe space (SIFS), which is sufficient time to completely transmit the packets, within a service period (SP) allocation or transmission opportunity (TXOP).

For each EDMG BRP-TX packet transmitted in the BRP TXSS procedure, a Packet Type field in an L-Header and an EDMG TRN Length, EDMG TRN-Unit P, EDMG TRN-Unit M, and EDMG TRN-Unit N fields in an EDMG-Header-A are set to indicate the configuration of a TRN field appended to the packets.

In particular, when the BRP TXSS is performed in channel aggregation, the EDMG BRP-TX packets may be transmitted using a non-EDMG duplicate format.)

The responder may transmit, to the initiator, a BRP frame including feedback based on a value of measurement performed by the responder during the BRP TXSS performed with the initiator. The feedback transmitted by the responder is separated by BRP interframe space (BRPIFS) from the last EDMG BRP-TX packet transmitted by the initiator, thereby providing sufficient time to completely transmit the frames within an SP allocation or TXOP. Otherwise, the feedback may be transmitted at the next available TXOP.

The BRP frame with the feedback transmitted by the responder may include an EDMG Channel Measurement Present subfield that is set to 1 and is included in the DMG Beam Refinement element.

In channel aggregation, an Aggregation Present field in the DMG Beam Refinement element transmitted via the BRP frame with the feedback transmitted by the responder may be set to 1.

The feedback transmitted by the responder may be a request according to an FBCK-REQ subfield in the DMG Beam Refinement element included in the BRP frame to start the procedure.

The BRP frame with the feedback transmitted by the responder may not include a TRN field.

The BRP TXSS procedure is completed when the responder transmits the BRP packet including the feedback.

Hereinafter, the foregoing BRP TXSS procedure is summarized as follows.

As illustrated in FIGS. 14 and 15, an initiator transmits a first BRP frame to a responder in order to request the execution of a BRP TXSS procedure. Here, a TXSS-REQ field in an EDMG Request element of the first BRP frame may be set to 1, and an FBCK-REQ subfield in a DMG Beam Refinement element of the first BRP frame may be set to 10001.

In response, the responder transmits a second BRP frame to the initiator. Here, a BRP-TXSS-OK subfield in a DMG Beam Refinement element of the second BRP frame may be set to 1. The responder may transmit the second BRP frame after MBIFPS from the time the first BRP frame is received.

The initiator and the responder may set up the BRP TXSS through the transmission and reception of the first and second BRP frames. In particular, the initiator and the responder may set up a BRP TXSS in channel aggregation by transmitting and receiving BRP frames including a DMG Beam Refinement element illustrated in FIG. 16.

FIG. 16 is a diagram schematically illustrating the configuration of a DMG Beam Refinement element that is applicable to the present disclosure.

In FIG. 16, the meanings of an Aggregation Request field and an Aggregation Present field may be set as follows.

If an EDMG extension flag is set to 1, the Aggregation Requested field is set to 1 in order to request channel measurement feedback for each aggregated channel and EDMG channel measurement feedback. Otherwise, this field is set to 0.

If an EDMG channel measurement feedback element is present, the Aggregation Present field is set to 1 in order to indicate that a subfield(s) for channel measurement feedback for each aggregated channel and a subfield(s) in EDMG channel measurement feedback are present. Otherwise, this field is set to 0.

As described above, according to a method proposed in the present disclosure, an initiator and a responder may transmit and receive information about channel aggregation using reserved bits in an existing DMG Beam Refinement element.

Alternatively, unlike in the above example, without depending on an EDMG Extension Flag bit, the initiator and the responder may indicate a request for and the presence of a channel measurement feedback element and an EDMG channel measurement feedback element using only the Aggregation Requested field and the Aggregation Present field. Alternatively, the initiator and the responder may indicate a request for and the presence of only EDMG channel measurement feedback using only the Aggregation Requested field and the Aggregation Present field.

After the BRP TXSS is set up through the transmission and reception of the BRP frames, the initiator may transmit an EDMG BRP-TX packet including a TRN field to the responder. The responder may forward a measurement value measured during the BRP TXX as feedback after BRPIFS from an EDMG BRP-TX packet transmitted last by the initiator.

Here, a BRP frame with the feedback transmitted from the responder may include a DMG Beam Refinement element in which an EDMG Channel Measurement Present subfield is set to 1.

Specifically, the responder may transmit the BRP including a channel measurement feedback element and an EDMG channel measurement feedback element to the initiator.

FIGS. 17 and 18 are diagrams illustrating a channel measurement feedback element that is applicable to the present disclosure.

As illustrated in FIGS. 17 and 18, the channel measurement feedback element includes SNR and Channel Measurement fields for aggregated channels including a primary channel among the aggregated channels and (additional) SNR and (additional) Channel Measurement fields for aggregated channels not including the primary channel.

Similar to the channel measurement feedback element, an EDMG channel measurement feedback element may be defined as in FIGS. 19 to 21.

For reference, a Tap Delay field and a Sector ID Order field in the channel measurement feedback element may not present for each aggregated channel, because these subfields may be replaced with a Tap Delay field and a Sector ID Order field in the EDMG channel measurement feedback element for an EDMG STA.

FIGS. 19 to 21 are diagrams illustrating an EDMG channel measurement feedback element that is applicable to the present disclosure.

As illustrated in FIGS. 19 to 21, the EDMG channel measurement feedback element includes EDMG Sector ID Order, BRP CDOWN, and Tap Delay fields for aggregated channels including a primary channel among the aggregated channels and (additional) EDMG Sector ID Order, (additional) BRP CDOWN, and (additional) Tap Delay fields for aggregated channels not including the primary channel.

Through the transmission and reception of signals configured as above, the initiator and the responder may perform a BRP TXSS in channel aggregation.

3.2. Single-User/Multiple-User Multiple Input Multiple Output (SU/MU MIMO)

In the present disclosure, a beamforming protocol for SU-MIMO or MU-MIM may include a SISO phase and a MIMO phase.

The SISO phase may be optionally applied in order to select candidates for beamforming training in the MIMO phase. Therefore, a description of an operation in the SISO phase is omitted in the present disclosure.

In the MIMO phase, an initiator and a responder train transmit and receive sectors and DMG antennas in order to determine an optimal combination of transmit and receive sectors and an antenna for MIMO transmission. Particularly, in MU-MIMO, an initiator and each responder in an MU group train transmit and receive sectors and DMG antennas in order to determine an optimal combination of transmit and receive sectors and an antenna for MIMO transmission in the MIMO phase.

Figure 22:
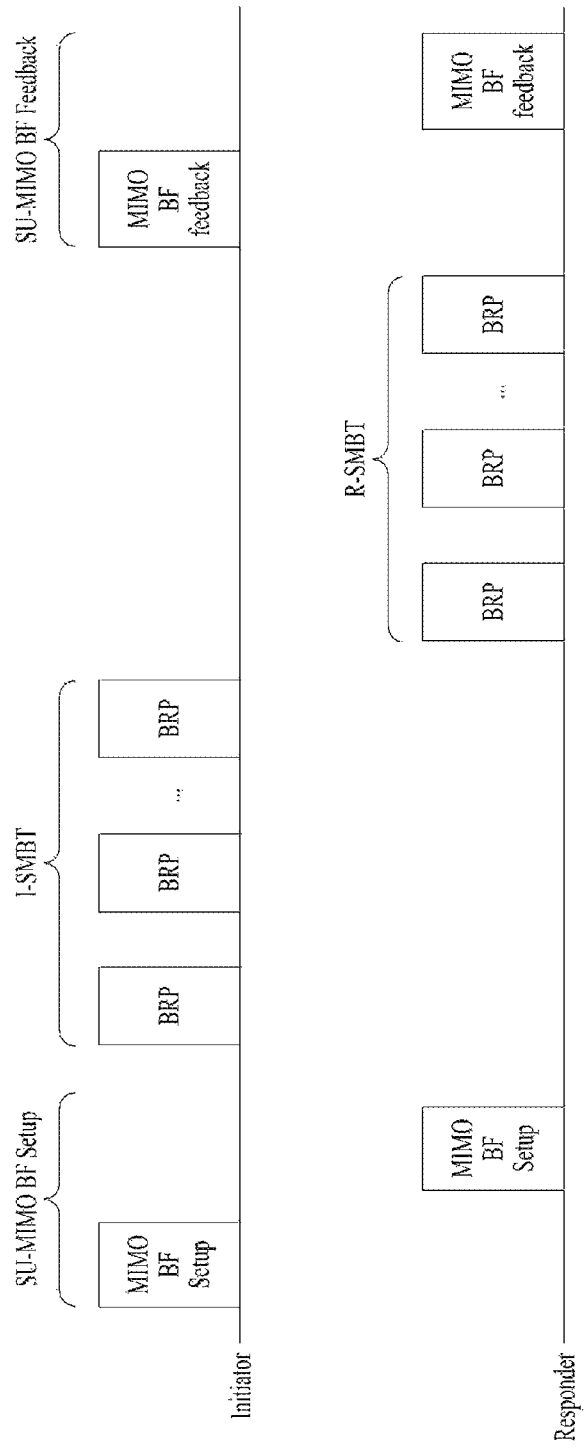
FIG. 22 is a drawing schematically illustrating a MIMO phase for SU-MIMO that is applicable to the present disclosure.

FIG. 22 is a drawing schematically illustrating a MIMO phase for SU-MIMO that is applicable to the present disclosure. As illustrated in FIG. 22, the MIMO phase for SU-MIMO may include four subphases: a SU-MIMO BF setup subphase; an initiator SU-MIMO BF training (SMBT) subphase; a responder SMBT subphase; and a SU-MIMO BF feedback subphase.

In the SU-MIMO BF setup subphase, the initiator may transmit, to the responder, a MIMO BF setup frame in which a SU/MU field is set to 1 and a Link Type field is set to 1. Particularly, in channel aggregation, the initiator may transmit a MIMO BF setup frame in which an Aggregation Requested field is set to 1 to the responder. A Transmitter Address (TA) field and a Receiver Address (RA) field of the MIMO BF setup frame may be set to a Medium Access Control (MAC) address of the initiator and a MAC address of the responder, respectively.

The responder may transmit a MIMO BF setup frame in which a SU/MU field is set to 1 and a Link Type field is set to 0 after SIFS from the time the MIMO BF setup frame is received from the initiator. Particularly, in channel aggregation, the responder may transmit a MIMO BF setup frame in which an Aggregation Requested field is set to 1 to the initiator.

The initiator may initiate the initiator SMBT subphase after MBIFS from the time the MIMO BF setup frame is received from the responder. In the initiator SMBT subphase, the initiator may transmit EDMG BRP-RX/TX packets (including a TRN field) to the responder. Particularly, in channel aggregation, the EDMG BRP-RX/TX packets may be transmitted using a non-EDMG duplicate format. Each EDMG BRP-RX/TX packet may be separated at an interval of SIFS.

Each transmitted EDMG BRP-RX/TX packet is used to train one or more transmit sectors and a certain number of receive AWVs (for each transmit sector). In each EDMG BRP-RX/TX packet, (for each selected transmit sector) the initiator may include a TRN field, which is for the responder to perform receive AWV training, in a PPDU.

The responder may initiate the responder SMBT subphase after MBIFS from the time the EDMG BRP-RX/TX packet with a BRP CDOWN field set to 0 is received from the initiator. In the responder SMBT subphase, the responder may transmit EDMG BRP-RX/TX packets (including a TRN field) to the initiator. Particularly, in channel aggregation, the EDMG BRP-RX/TX packets may be transmitted using the non-EDMG duplicate format. The transmitted EDMG BRP-RX/TX packets may be separated at an interval of SIFS.

The initiator may initiate the SU-MIMO BF feedback subphase after MBIFS from the time the EDMG BRP-RX/TX packet with a BRP CDOWN field set to 0 is received from the responder. All frames transmitted in the SU-MIMO BF feedback subphase may be transmitted using a DMG control mode. In the SU-MIMO BF feedback subphase, the initiator may transmit, to the responder, a MIMO BF feedback frame in which a SU/MU field is set to 1 and a Link Type field is set to 0. Particularly, in channel aggregation, the initiator may transmit a MIMO BF feedback frame with an Aggregation Present field set to 1 to the responder. A TA field of the MIMO BF feedback frame may be set to the MAC address of the initiator, and a RA field may be set to the MAC address of the responder.

The responder may transmit, to the initiator, a MIMO BF feedback frame in which a SU/MU field is set to 1 and a Link Type field is set to 1 after SIFS from the time the MIMO BF feedback frame is received from the initiator. Particularly, in channel aggregation, the responder may transmit a MIMO BF feedback frame with an Aggregation Present field set to 1 to the initiator. A TA field of the MIMO BF feedback may be set to the MAC address of the responder, and a RA field may be set to the MAC address of the initiator.

In addition, a MIMO phase for MU-MIMO may include a downlink MIMO phase and an uplink MIMO phase.

Figure 23:
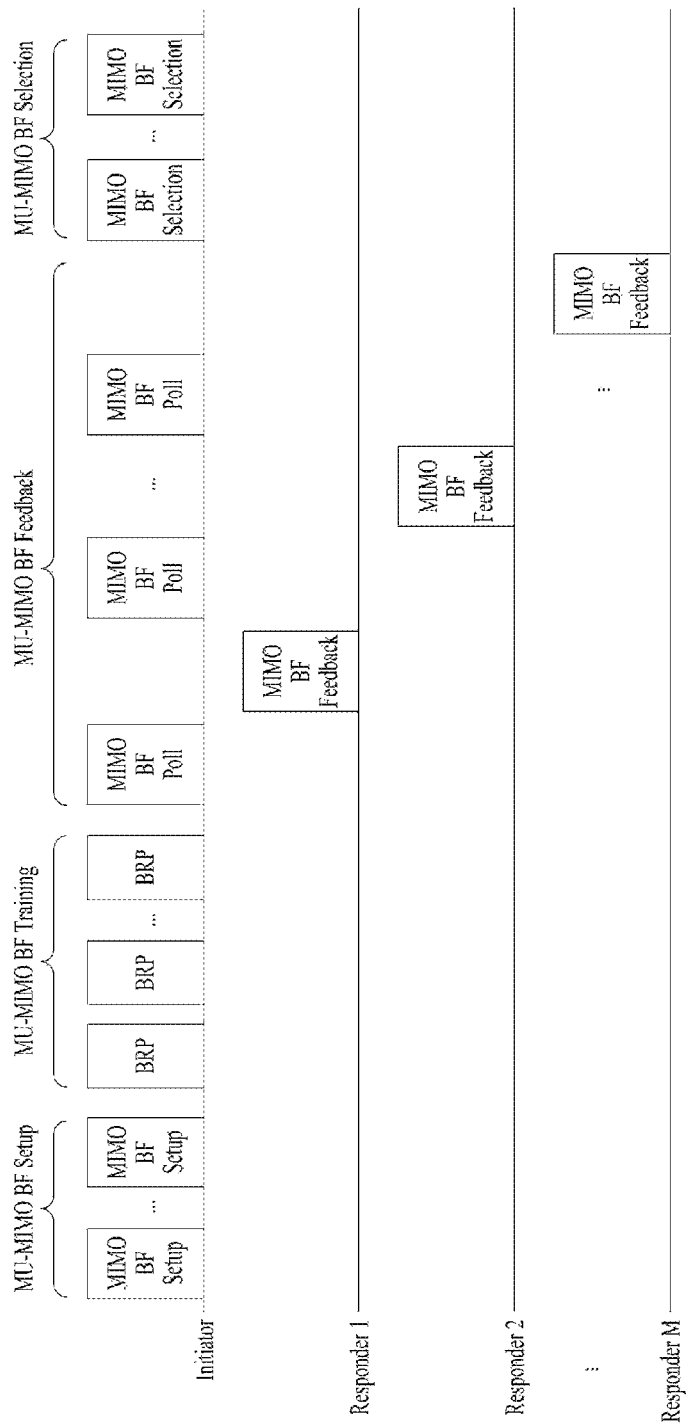
FIG. 23 is a drawing schematically illustrating a downlink MIMO phase that is applicable to the present disclosure.

FIG. 23 is a drawing schematically illustrating a downlink MIMO phase that is applicable to the present disclosure.

As illustrated in FIG. 23, the downlink MIMO phase may include four subphases: a MU-MIMO setup subphase; a MU-MIMO BF training subphase; a MU-MIMO BF feedback subphase; and a MU-MIMO BF selection subphase.

Here, the MU-MIMO BF training subphase and the MU-MIMO BF feedback subphase may not be included in the MIMO phase depending on conditions.

In the MU-MIMO BF setup subphase, an initiator may transmit, to each responder in a MU group, one or more MIMO BF setup frames in which a SU/MU field is set to 0 and a DL/UL MIMO Phase field is set to 1. Particularly, in channel aggregation, the initiator may transmit one or more MIMO BF setup frames with an Aggregation Requested field set to 1 to each responder in the MU group. The initiator may transmit a minimum number of MIMO BF setup frames such that the frames reach all responders in the MU group.

The MIMO BF setup frames may be transmitted using the DMG control mode or using a non-EDMG duplicate PPDU transmitted along with a DMG control modulation class.

The initiator may initiate the MU-MIMO BF training subphase after MBIFS from the time the MIMO BF setup frames are transmitted. In the MU-MIMO BF training subphase, the initiator may transmit one or more EDMG BRP-RX/TX packets to the remaining responders in the MU group. Particularly, in channel aggregation, each EDMG BRP-RX/TX packets may be transmitted using the non-EDMG duplicate format. The EDMG BRP-RX/TX packets may be separated by SIFS.

The initiator may initiate the MU-MIMO BF feedback subphase after MBIFS from the time the EDMG BRP RX-TX packets with a BRP CDOWN field set to 0 are transmitted. In the MU-MIMO BF feedback subphase, the initiator may transmit a MIMO BF poll frame with a Poll Type field set to 0 for polling to collect, from each remaining responder, MU-MIMO BF feedback from the preceding MU-MIMO BF training subphase. The MIMO BF poll frame may be transmitted using the DMG control mode.

Upon receiving the MIMO BF poll frame for which a remaining responder is an addressed recipient, the responder may transmit a MIMO BF feedback frame with a SU/MU field set to 1 to the initiator. Particularly, in channel aggregation, the responder may transmit a MIMO BF feedback frame with an Aggregation Present field set to 1 to the initiator. A RA field of the MIMO BF feedback frame may be set to a basic service set identity (BSSID) of the initiator, and a TA field may be set to a MAC address of the responder.

The initiator may initiate the MU-MIMO BF selection subphase after MBIFS from the time the MIMO BF feedback frame is transmitted from the last remaining responder. In the MU-MIMO BF selection subphase, the initiator may transmit one or more MIMO BF selection frames with a MU-MIMO Transmission Configuration Type set to 1 to each responder in the MU group. The initiator may transmit a minimum number of MIMO BF selection frames such that the frames reach all responders in the MU group. The MIMO BF selection frames may be transmitted using the DMG control mode.

Figure 24:
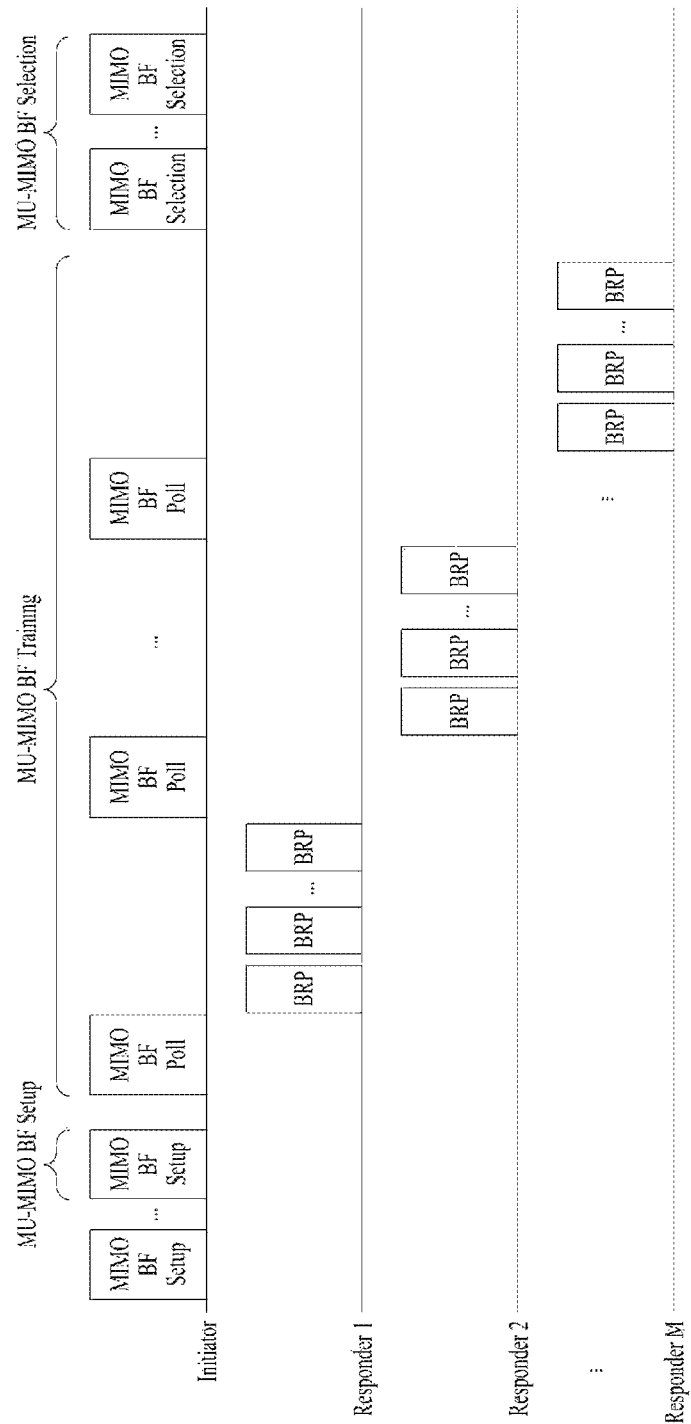
FIG. 24 is a drawing schematically illustrating an uplink MIMO phase that is applicable to the present disclosure.

FIG. 24 is a drawing schematically illustrating an uplink MIMO phase that is applicable to the present disclosure.

The uplink MIMO phase may reduce the length of a MU-MIMO BF training interval.

An initiator may initiate an uplink MIMO phase when the following conditions are satisfied if:

If a UL MU-MIMO Supported field in an EDMG Capabilities element for the initiator and an intended receiver is equal to 1; and If an Antenna Pattern Reciprocity field in a DMG Capabilities element for the initiator is equal to 1.

As illustrated in FIG. 24, the uplink MIMO phase may include three subphases: a MU-MIMO BF setup subphase; a MU-MIMO BF training subphase; and a MU-MIMO selection subphase. The subphases are separated by MBIFPS.

Here, the MU-MIMO BF training subphase may not be included depending on conditions.

In the MU-MIMO BF setup subphase, the initiator may transmit one or more MIMO BF setup frames in which a SU/MU field is set to 0 and a DL/UL MU-MIMO Phase field is set to 0 to each responder in a MU group. Particularly, in channel aggregation, the initiator may transmit one or more MIMO BF setup frames with an Aggregation Requested field set to 1 to each responder in the MU group. The initiator may transmit a minimum number of MIMO BF setup frames such that the frames reach all responders in the MU group.

The MIMO BF setup frames may be transmitted using the DMG control mode or using a non-EDMG duplicate PPDU transmitted along with a DMG control modulation class.

The initiator may initiate the MU-MIMO BF training subphase after MBIFS from the time the MIMO BF setup frames are transmitted. In the MU-MIMO BF training subphase, the initiator may transmit a MIMO BF poll frame with a Poll Type field set to 1 to each remaining responder in the MU group. Each MIMO BF poll frame may be transmitted using the DMG control mode or using a non-EDMG duplicate PPDU transmitted along with a DMG control modulation class.

Upon receiving the MIMO BF poll frame for which a remaining responder is a recipient, if a TXVECTOR parameter EDMG_TRN_LEN is set to a value greater than 0, parameters RX_TRN_PER_TX_TRN, EDMG_TRN_M, and EDMG_TRN_P are set to a value in a L-TX-RX field, and a Requested EDMG TRN-Unit M field and a Requested EDMG TRN-Unit P field are respectively received via corresponding MIMO BF poll frames, the responder may transmit one or more EDMG BRP-RX/TX packets to the initiator. Particularly, in channel aggregation, each EDMG BRP-RX/TX packet may be transmitted using the non-EDMG duplicate format.

Additionally, the responder may transmit each EDMG BRP-RX/TX packet to simultaneously train multiple TX DMG antennas using a TRN subfield, thereby reducing the training time. A TX Antenna Mask field of each EDMG BRP-RX/TX packet may indicate a TX DMG antenna which is used by the responder to transmit the EDMG BRP-RX/TX packet. A BRP CDOWN field in each EDMG BRP-RX/TX packet may indicate the number of remaining EDMG BRP RX/TX packets to be transmitted by the responder.

Hereinafter, a MIMO phase applicable to the foregoing beamforming procedure for SU/MU MIMO is summarized as follows.

As illustrated in FIGS. 22 to 24, an initiator transmits a MIMO BF setup frame to a responder in order to set up SU/MU MIMO BF. As described above, the initiator may transmit a request for BF setup for SU-MIMO or BF setup for MU-MIMO to the responder using the value of a SU/MU field in the MIMO BF setup frame. In particular, the initiator may request, from the responder, channel measurement feedback for a link specified by a Link Type field through a MIMO FBCK-REQ field in the MIMO BF setup frame. Here, the MIMO BF setup frame may be transmitted without a TRN field.

FIG. 25 is a diagram illustrating a MIMO Setup Control element applicable to the present disclosure, and FIG. 26 is a diagram illustrating the configuration of a MIMO FBCK-REQ field included in the MIMO Setup Control element applicable to the present disclosure.

An initiator may request channel measurement feedback on each aggregated channel using the value of an Aggregation Requested field in the MIMO FBCK-REQ field included in the MIMO Setup Control element. Specifically, the Aggregation Requested field may have the following meaning.

The Aggregation Requested field is set to 1 in order to request channel measurement feedback on each aggregated channel as part of MIMO BF feedback. Otherwise, this field is set to 0.

Further, in SU-MIMO, the initiator may transmit a MIMO BF setup frame to one intended responder. In MU-MIMO, the initiator may transmit a MIMO BF setup frame to a plurality of intended responders.

In SU-MIMO, the responder may transmit a MIMO BF setup frame to the initiator in response to the MIMO BF setup frame received from the initiator. Here, in channel aggregation, an Aggregation Requested field in the MIMO BF setup frame may also be set to 1.

In MU-MIMO, upon receiving the MIMO BF setup frame from the initiator, the responder may not transmit a MIMO BF setup frame in response thereto. That is, in MU-MIMO, a MIMO BF setup frame may be transmitted only from the initiator to the plurality of responders.

Then, in SU-MIMO and downlink MIMO for MU-MIMO, the initiator may transmit a BRP frame for BF training to the responder. In response, the responder may transmit a MIMO BF feedback frame to the initiator.

The MIMO BF feedback frame may transmit a Channel Measurement Feedback element and an EDMG Channel Measurement Feedback element illustrated in FIGS. 17 to 21 together with a MIMO Feedback Control element illustrated in FIG. 27.

FIG. 27 is a diagram illustrating a MIMO Feedback Control element applicable to the present disclosure, and FIG. 28 is a diagram illustrating the configuration of a MIMO FBCK-TYPE field included in the MIMO Feedback Control element applicable to the present disclosure.

The responder may indicate to the initiator that there are subfields for MIMO BF feedback for each aggregated channel using the value of an Aggregation Present field in the MIMO FBCK-TYPE field included in the MIMO Feedback Control element. Specifically, the Aggregation Present field may have the following meaning.

The Aggregation Present subfield is set to 1 in order to indicate that there is channel measurement feedback for each channel in channel aggregation. Otherwise, this field is set to 0.

Accordingly, the initiator may receive feedback information for MIMO BF from one or more responders.

In an uplink MIMO phase for MU-MIMO, however, the operations of the initiator and the responders may be different from those described above.

As illustrated in FIG. 24, during the MIMO BF training subphase, the initiator transmits a MIMO BF poll frame to one or more responders included in the MU group, and the one or more responders transmits an EDMG BRP-RX/TX packet to the initiator in response. Then, the initiator may determine an optimal receive AWV for the one or more responders using the EDMG BRP-RX/TX packet received from each responder, and may provide TX DMG antenna information corresponding to the receive AWV to one responder based on reciprocity.

Hereinafter, a specific method of supporting beamforming for channel aggregation proposed in the present disclosure is described based on the above description.

Figure 29:
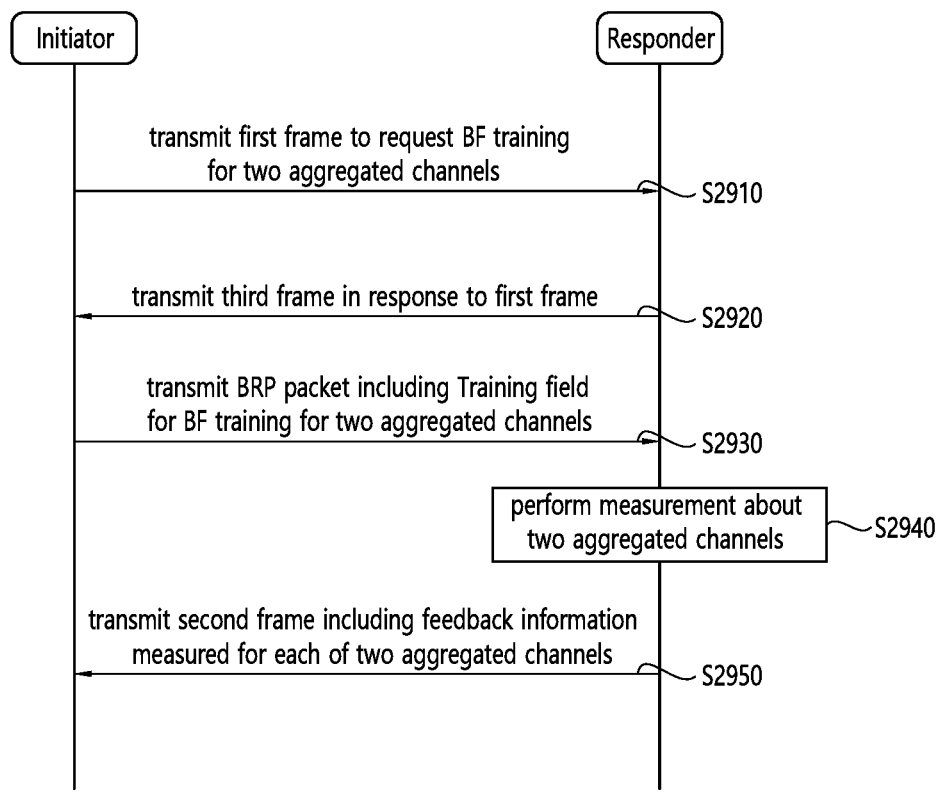
FIG. 29 is a diagram illustrating a method for supporting beamforming between two STAs that is applicable to the present disclosure.

FIG. 29 is a diagram illustrating a method for supporting beamforming between two STAs that is applicable to the present disclosure.

For the convenience of description, FIG. 29 shows only a method of supporting beamforming in one direction (e.g., from an initiator to a responder) between a STA (e.g., the initiator) to transmit a signal and a STA (e.g., the responder) to receive the signal. However, in addition to the above configuration, it is also possible to support beamforming in a different direction (e.g., from a responder to an initiator) by reversing the operation disclosed in FIG. 29.

As illustrated in FIG. 29, an initiator transmits a first frame to request beamforming training for two aggregated channels to a responder (S2910).

Here, the two aggregated channels may be two single channels or two channels of two bonded channels. More specifically, the two aggregated channels may be two channels on a 2.16 GHz band/channel or two channels on a 4.32 GHz band/channel.

In the present disclosure, the first frame may not include a separate Training field. That is, the first frame may be transmitted using a DMG control mode.

The initiator transmits, to the responder, a BRP packet including a Training field for beamforming training for the two aggregated channels (S2930). Upon receiving the BRP packet including the Training field, the responder performs channel measurement about the two aggregated channels based on the BRP packet including the Training field (S2940).

The responder transmits a second frame including feedback information measured for each of the two aggregated channels to the initiator (S2950). That is, the initiator receives the second frame including the feedback information measured for each of the two aggregated channels from the responder. Here, the second frame may not include a separate Training field. That is, the second frame may be transmitted using the DMG control mode.

In this configuration, the feedback information may include signal-to-noise ratio (SNR) information, channel measurement information, enhanced directional multi-gigabit (EDMG) sector identity (ID) information, BRP countdown (CDOWN) information, and tap delay information per channel, which are measured for the two aggregated channels.

Here, the SNR information and the channel measurement information per channel, which are measured for the two aggregated channels, may be transmitted via a channel measurement feedback element included in the second frame, and the EDMG sector identity ID information, the BRP CDOWN information, and the tap delay information per channel, which are measured for the two aggregated channels, may be transmitted via an EDMG channel measurement feedback element included in the second frame.

Hereinafter, a specific beamforming support method for a BRP TXSS, a specific beamforming support method for SU-MIMO, and a specific beamforming support method in a downlink MIMO phase for MU-MIMO, which are supported by the present disclosure, will be described in detail based on of the foregoing description.

First, in a BRP TXSS, the first frame may correspond to a first BRP frame in which an Aggregation Requested field in a DMG Beam Refinement element is set to 1. Here, the first BRP frame may be transmitted in the DMG control mode not including a Training field.

In this case, the initiator may receive, from the responder, a second BRP frame in which an Aggregation Requested field in a DMB Beam Refinement element is set to 1 in response to the first BRP frame (S2920). Here, the second BRP frame (or the third frame) may be transmitted in the DMG control mode not including a Training field.

Also, in the BRP TXSS, the feedback information may be transmitted via a second frame in which an Aggregation Present field in the DMG Beam Refinement element is set to 1. Here, the second frame may be transmitted in the DMG control mode not including a Training field.

In another example, in SU-MIMO, the first frame may correspond to a first MIMO BF setup frame that includes a SU/MU field set to 1, a Link Type field set to 1, and an Aggregation Requested field set to 1. Here, the first MIMO BF setup frame may be transmitted in the DMG control mode not including a Training field.

Here, the SU/MU field, the Link Type field, and the Aggregation Requested field may be included in a MIMO Setup Control element. In particular, the Aggregation Requested field may be included in a MIMO FBCK-REQ field included in the MIMO Setup Control element.

In this case, the initiator may receive, from the responder, a second MIMO BF setup frame that includes a SU/MU field set to 1, a Link Type field set to 0, and an Aggregation Requested field set to 1 in response to the first MIMO BF setup frame (S2920). Here, the second MIMO BF setup frame may be transmitted in the DMG control mode not including a Training field.

Further, in SU-MIMO, the feedback information may be transmitted via a MIMO BF feedback frame in which an Aggregation Present field in a MIMO feedback control element is set to 1. Here, the MIMO BF feedback frame may be transmitted using the DMG control mode not including a Training field.

In still another example, in a downlink MIMO phase for MU-MIMO, the first frame may correspond to a MIMO BF setup frame that includes a SU/MU field set to 0 and an Aggregation Requested field set to 1. Here, the MIMO BF setup frame may be transmitted using the DMG control mode not including a Training field.

As described above, the SU/MU field, the Link Type field, and the Aggregation Requested field may be included in a MIMO Setup Control element. In particular, the Aggregation Requested field may be included in a MIMO FBCK-REQ field included in the MIMO Setup Control element.

Further, in the downlink MIMO phase for MU-MIMO, the feedback information may be transmitted via a MIMO BF feedback frame in which an Aggregation Present field in a MIMO feedback control element is set to 1. Here, the MIMO BF feedback frame may be transmitted using the DMG control mode not including a Training field.

4. Device Configuration

Figure 30:
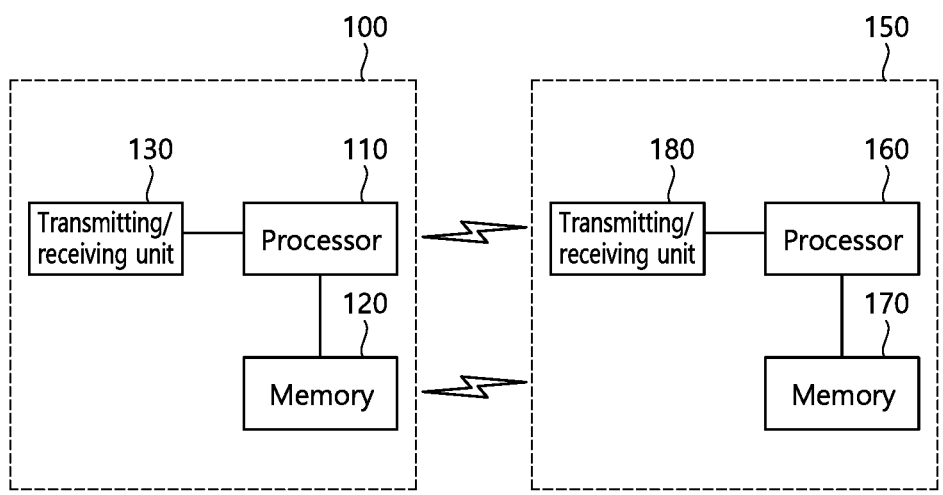
FIG. 30 is a diagram describing a device for implementing the above-described method.

FIG. 30 is a diagram describing a device for implementing the above-described method.

A wireless device (100) in FIG. 30 may correspond to a STA transmitting a signal, which is described above, and a wireless device (150) may correspond to a STA receiving the signal, which is described above.

Here, the STA transmitting the signal may correspond to an 11ay UE or PCP/AP supporting the 11ay system, and the STA receiving the signal may correspond to an 11ay UE or PCP/AP supporting the 11ay system.

Hereinafter, for the convenience of description, the STA transmitting the signal is referred to as a transmitting device (100), and the STA receiving the signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present disclosure is provided so that anyone skilled in the art can implement and execute the present disclosure. In the detailed description presented herein, although the present disclosure is described with reference to the preferred exemplary embodiment of the present disclosure, it will be understood by anyone having ordinary skills in the art that diverse modifications, alterations, and variations can be made in the present disclosure. Therefore, the scope and spirit of the present disclosure will not be limited only to the exemplary embodiments of the present disclosure set forth herein. Thus, it is intended to provide the broadest scope and spirit of the appended claims of the present disclosure that are equivalent to the disclosed principles and novel characteristics of the present disclosure.

INDUSTRIAL APPLICABILITY

Although the present disclosure has been described in detail under the assumption that the present disclosure can be applied to an IEEE 802.11 based wireless LAN (WLAN) system, the present disclosure will not be limited only to this. It will be understood that the present disclosure can be applied to diverse wireless systems capable of performing data transmission based on channel bonding by using the same method as presented herein.

What is claimed is:

1. A method for supporting, by a first station (STA), beamforming with a second STA in a wireless local area network (WLAN) system, the method comprising:

transmitting, to the second STA, a first frame to request beamforming training for two aggregated channels;

transmitting a beam refinement protocol (BRP) packet comprising a Training field to the second STA; and receiving, from the second STA, a second frame comprising feedback information measured for each of the two aggregated channels based on the BRP packet and further comprising an aggregation present field which has a value of '1' when the feedback information is channel information measured for each of the two aggregated channels, wherein the feedback information comprises signal-to-noise ratio (SNR) information, channel measurement information, enhanced directional multi-gigabit (EDMG) sector identity (ID) information, BRP countdown (CDOWN) information, and tap delay information per channel, which are measured for the two aggregated channels, wherein the SNR information and the channel measurement information per channel, which are measured for the two aggregated channels, are transmitted via a channel measurement feedback element comprised in the second frame, and wherein the EDMG sector identity ID information, the BRP CDOWN information, and the tap delay information per channel, which are measured for the two aggregated channels, are transmitted via an EDMG channel measurement feedback element comprised in the second frame.

2. The method of claim 1, wherein the two aggregated channels are two channels on a 2.16 GHz band or two channels on a 4.32 GHz band.

3. The method of claim 1, wherein the first frame and the second frame do not comprise the Training field.

4. The method of claim 1, wherein the first frame corresponds to a first BRP frame in which an Aggregation Requested field in a directional multi-gigabit (DMG) beam refinement element is set to 1.

5. The method of claim 4, further comprising:
receiving, from the second STA, a second BRP frame in which an Aggregation Requested field in a DMB beam refinement element is set to 1 in response to the first BRP frame.

6. The method of claim 4, wherein the second frame corresponds to a third BRP frame in which an Aggregation Present field in the DMB beam refinement element is set to 1.

7. The method of claim 1, wherein the first frame corresponds to a first multiple input multiple output (MIMO) beamforming setup frame that comprises a Single User (SU)/Multi-User (MU) field set to 1, a Link Type field set to 1, and an Aggregation Requested field set to 1.

8. The method of claim 7, further comprising:
receiving, from the second STA, a second MIMO beamforming setup frame that comprises a SU/MU field set to 1, a Link Type field set to 0, and an Aggregation Requested field set to 1 in response to the first MIMO beamforming setup frame.

9. The method of claim 7, wherein the second frame corresponds to a third MIMO beamforming feedback frame in which an Aggregation Present field in a MIMO feedback control element is set to 1.

10. The method of claim 7, wherein the second frame corresponds to a MIMO beamforming feedback frame in which an Aggregation Present field in a MIMO feedback control element is set to 1.

11. The method of claim 1, wherein the first frame corresponds to a MIMO beamforming setup frame that comprises a SU/MU field set to 0 and an Aggregation Requested field set to 1.

12. A method for supporting, by a first station (STA), beamforming with a second STA in a wireless local area network (WLAN) system, the method comprising:
- receiving, from the second STA, a first frame to request beamforming training for two aggregated channels that are aggregated;
- receiving a beam refinement protocol (BRP) packet comprising a Training field from the second STA;
- performing channel measurement about the two aggregated channels based on the BRP packet comprising the Training field; and
- transmitting, to the second STA, a second frame comprising feedback information measured for each of the two aggregated channels based on the BRP packet, and further comprising an aggregation present field which has a value of '1' when the feedback information is channel information measured for each of the two aggregated channels,
- wherein the feedback information comprises signal-to-noise ratio (SNR) information, channel measurement information, enhanced directional multi-gigabit (EDMG) sector identity (ID) information, BRP countdown (CDOWN) information, and tap delay information per channel, which are measured for the two aggregated channels,
- wherein the SNR information and the channel measurement information per channel, which are measured for the two aggregated channels, are transmitted via a channel measurement feedback element comprised in the second frame, and
- wherein the EDMG sector identity ID information, the BRP CDOWN information, and the tap delay information per channel, which are measured for the two aggregated channels, are transmitted via an EDMG channel measurement feedback element comprised in the second frame.

13. A station device for supporting beamforming in a wireless local area network (WLAN) system, the station device comprising:
- a transceiver configured to have one or more radio frequency (RF) chains and to transmit and receive a signal to and from another station device; and
- a processor configured to be connected to the transceiver and to process a signal transmitted to and received from the other station device,
- wherein the processor is configured to:
- transmit, to the second STA, a first frame to request beamforming training for two aggregated channels;
- transmit a beam refinement protocol (BRP) packet comprising a Training field to the second STA; and
- receive, from the second STA, a second frame comprising feedback information measured for each of the two aggregated channels based on the BRP packet, and further comprising an aggregation present field which has a value of '1' when the feedback information is channel information measured for each of the two aggregated channels,
- wherein the feedback information comprises signal-to-noise ratio (SNR) information, channel measurement information, enhanced directional multi-gigabit (EDMG) sector identity (ID) information, BRP countdown (CDOWN) information, and tap delay information per channel, which are measured for the two aggregated channels,
- wherein the SNR information and the channel measurement information per channel, which are measured for the two aggregated channels, are transmitted via a channel measurement feedback element comprised in the second frame, and
- wherein the EDMG sector identity ID information, the BRP CDOWN information, and the tap delay information per channel, which are measured for the two aggregated channels, are transmitted via an EDMG channel measurement feedback element comprised in the second frame.

* * * * *